United States Patent
Romick et al.

(10) Patent No.: US 9,938,413 B2
(45) Date of Patent: *Apr. 10, 2018

(54) COATING COMPOSITION AND ARTICLES MADE THEREFROM

(71) Applicant: Dow Global Technologies LLC, Midland, MI (US)

(72) Inventors: Jay D. Romick, Midland, MI (US); Qing Zhang, Midland, MI (US); David L. Malotky, Midland, MI (US); Richard A. Lundgard, Midland, MI (US); Jodi M. Mecca, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 333 days.

This patent is subject to a terminal disclaimer.

(21) Appl. No.: 14/653,303

(22) PCT Filed: Dec. 13, 2013

(86) PCT No.: PCT/US2013/075071
§ 371 (c)(1),
(2) Date: Jun. 18, 2015

(87) PCT Pub. No.: WO2014/105466
PCT Pub. Date: Jul. 3, 2014

(65) Prior Publication Data
US 2015/0337140 A1   Nov. 26, 2015

Related U.S. Application Data

(63) Continuation of application No. 13/729,073, filed on Dec. 28, 2012, now Pat. No. 8,722,787.

(51) Int. Cl.
| | |
|---|---|
| C09D 5/08 | (2006.01) |
| C09D 123/06 | (2006.01) |
| C09D 123/12 | (2006.01) |
| C09D 123/14 | (2006.01) |
| C08L 23/06 | (2006.01) |
| C08L 23/12 | (2006.01) |
| C08L 23/14 | (2006.01) |

(52) U.S. Cl.
CPC ............ *C09D 5/08* (2013.01); *C08L 23/06* (2013.01); *C08L 23/12* (2013.01); *C08L 23/14* (2013.01); *C09D 123/06* (2013.01); *C09D 123/12* (2013.01); *C09D 123/14* (2013.01); *Y10T 428/31511* (2015.04); *Y10T 428/31587* (2015.04); *Y10T 428/31667* (2015.04); *Y10T 428/31692* (2015.04)

(58) Field of Classification Search
None
See application file for complete search history.

(56) References Cited

U.S. PATENT DOCUMENTS

| | | |
|---|---|---|
| 3,166,613 A | 1/1965 | Wright et al. |
| 3,245,934 A | 4/1966 | Krzyszkowski |
| 3,422,049 A | 1/1969 | McClain |
| 3,432,483 A | 3/1969 | Peoples et al. |
| 3,456,044 A | 7/1969 | Pahlke |
| 3,554,994 A | 1/1971 | Maloney et al. |
| 3,645,992 A | 2/1972 | Elston |
| 3,741,253 A | 6/1973 | Brax et al. |
| 3,746,681 A | 7/1973 | McClain |
| 3,908,050 A | 9/1975 | Gor |
| 4,038,477 A | 7/1977 | Inoue et al. |
| 4,076,698 A | 2/1978 | Anderson et al. |
| 4,352,849 A | 10/1982 | Mueller |
| 4,542,199 A | 9/1985 | Kaminsky et al. |
| 4,543,399 A | 9/1985 | Jenkins, III et al. |
| 4,551,380 A | 11/1985 | Schoenberg |

(Continued)

FOREIGN PATENT DOCUMENTS

| | | |
|---|---|---|
| DE | 4428382 | 2/1996 |
| EP | 0277003 | 8/1988 |
| EP | 0277004 | 8/1988 |
| EP | 0359045 | 3/1990 |
| EP | 0426637 | 5/1991 |
| EP | 0427697 | 5/1991 |
| EP | 0495375 | 7/1992 |
| EP | 0520732 | 12/1992 |
| EP | 0525205 | 2/1993 |
| EP | 0573403 | 12/1993 |

(Continued)

OTHER PUBLICATIONS

International Search Report from related PCT Application PCT/US2004027641 completed Dec. 8, 2004.

(Continued)

*Primary Examiner* — Sheeba Ahmed
(74) *Attorney, Agent, or Firm* — Brooks, Cameron & Huebsch, PLLC

(57) ABSTRACT

The present disclosure includes a waterborne polyolefin based coating layer that has improved features as compared to epoxy coatings. The coating composition of the present disclosure include 40 to 80 weight percent (wt. %) of a base polymer; 10 to 30 wt. % of a polymeric stabilizing agent; 5 to 15 wt. % of a polymeric coupling agent; 0 to 35 wt. % of a polymeric performance improving agent; a neutralizing agent that partially or fully neutralize the polymeric stabilizing agent; and a fluid medium, where the wt. % values are based on the total weight of the base polymer, the polymeric coupling agent, the polymeric stabilizing agent and, when present, the polymeric performance improving agent (as used herein, this total weight of the base polymer, the polymeric coupling agent, the polymeric stabilizing agent and, when present, the polymeric performance improving agent may be referred to as the "solid content" of the coating composition).

20 Claims, No Drawings

(56) References Cited

U.S. PATENT DOCUMENTS

| | | |
|---|---|---|
| 4,588,790 A | 5/1986 | Jenkins, III et al. |
| 4,597,920 A | 7/1986 | Golike |
| 4,599,392 A | 7/1986 | McKinney et al. |
| 4,689,351 A | 8/1987 | Endo et al. |
| 4,749,616 A | 6/1988 | Liu et al. |
| 4,752,597 A | 6/1988 | Turner |
| 4,798,081 A | 1/1989 | Hazlitt et al. |
| 4,808,561 A | 2/1989 | Welborn, Jr. et al. |
| 4,818,785 A | 4/1989 | Otawa et al. |
| 4,820,557 A | 4/1989 | Warren |
| 4,837,084 A | 6/1989 | Warren |
| 4,865,902 A | 9/1989 | Golike et al. |
| 4,871,705 A | 10/1989 | Hoel |
| 4,897,455 A | 1/1990 | Welborn, Jr. et al. |
| 4,912,075 A | 3/1990 | Chang |
| 4,927,708 A | 5/1990 | Herran et al. |
| 4,937,217 A | 6/1990 | Chang |
| 4,937,301 A | 6/1990 | Chang |
| 4,952,451 A | 8/1990 | Mueller |
| 4,963,419 A | 10/1990 | Lustig et al. |
| 4,988,781 A | 1/1991 | McKinney et al. |
| 4,996,259 A | 2/1991 | Koehler et al. |
| 5,008,288 A | 4/1991 | Stracher et al. |
| 5,017,714 A | 5/1991 | Welborn, Jr. |
| 5,028,670 A | 7/1991 | Chinh et al. |
| 5,059,481 A | 10/1991 | Lustig et al. |
| 5,086,025 A | 2/1992 | Chang |
| 5,120,867 A | 6/1992 | Welborn, Jr. |
| 5,132,262 A | 7/1992 | Rieger et al. |
| 5,147,949 A | 9/1992 | Chang |
| 5,198,401 A | 3/1993 | Turner et al. |
| 5,228,531 A | 7/1993 | Patterson et al. |
| 5,238,892 A | 8/1993 | Chang |
| 5,243,001 A | 9/1993 | Winter et al. |
| 5,272,236 A | 12/1993 | Lai et al. |
| 5,278,119 A | 1/1994 | Turner et al. |
| 5,278,264 A | 1/1994 | Spaleck et al. |
| 5,278,272 A | 1/1994 | Lai et al. |
| 5,296,434 A | 3/1994 | Karl et al. |
| 5,304,614 A | 4/1994 | Winter et al. |
| 5,324,800 A | 6/1994 | Welborn, Jr. et al. |
| 5,360,648 A | 11/1994 | Falla et al. |
| 5,364,486 A | 11/1994 | Falla et al. |
| 5,387,568 A | 2/1995 | Ewen et al. |
| 5,391,629 A | 2/1995 | Turner et al. |
| 5,504,172 A | 4/1996 | Imuta et al. |
| 5,539,021 A | 7/1996 | Pate et al. |
| 5,545,504 A | 8/1996 | Koeshkerian et al. |
| 5,574,091 A | 11/1996 | Walther et al. |
| 5,677,383 A | 10/1997 | Chum et al. |
| 5,721,025 A | 2/1998 | Falla et al. |
| 5,756,659 A | 5/1998 | Hughes et al. |
| 5,798,410 A | 8/1998 | Walther et al. |
| 5,844,045 A | 12/1998 | Kolthammer et al. |
| 5,869,575 A | 2/1999 | Kolthammer et al. |
| 5,874,139 A | 2/1999 | Bosiers et al. |
| 5,879,768 A | 3/1999 | Falla et al. |
| 5,938,437 A | 8/1999 | DeVincenzo |
| 5,942,579 A | 8/1999 | Falla et al. |
| 6,106,822 A | 8/2000 | Rademacher et al. |
| 6,111,023 A | 8/2000 | Chum et al. |
| 6,117,465 A | 9/2000 | Falla et al. |
| 6,130,266 A | 10/2000 | Mihayashi et al. |
| 6,174,569 B1 | 1/2001 | Blomer et al. |
| 6,221,191 B1 | 4/2001 | Davis et al. |
| 6,235,143 B1 | 5/2001 | Crighton et al. |
| 6,316,549 B1 | 11/2001 | Chum et al. |
| 6,339,123 B1 | 1/2002 | Raetzsch et al. |
| 6,448,321 B1 | 9/2002 | Tokita |
| 6,448,341 B1 | 9/2002 | Klothmmer et al. |
| 6,448,621 B1 | 9/2002 | Thakur |
| 6,455,636 B2 | 9/2002 | Sanada et al. |
| 6,525,157 B2 | 2/2003 | Cozewith |
| 6,538,070 B1 | 3/2003 | Cardwell et al. |
| 6,566,446 B1 | 5/2003 | Parikh et al. |
| 6,767,956 B2 | 7/2004 | Choudhery et al. |
| 6,777,096 B2 | 8/2004 | Shiba et al. |
| 6,960,635 B2 | 11/2005 | Stevens et al. |
| 7,803,865 B2 | 9/2010 | Moncla et al. |
| 7,947,776 B2 | 5/2011 | Moncla et al. |
| 8,063,128 B2 | 11/2011 | Moncla et al. |
| 8,158,711 B2 | 4/2012 | Moncla et al. |
| 8,779,053 B2 * | 7/2014 | Lundgard ............ C09D 123/06 524/523 |
| 8,946,329 B2 * | 2/2015 | Wilbur ................ C09D 7/1241 428/339 |
| 9,169,406 B2 * | 10/2015 | Wilbur ................ C09D 7/125 |
| 9,416,291 B2 * | 8/2016 | Wilbur ................ C09D 7/125 |
| 9,422,444 B2 * | 8/2016 | Lundgard ............ C09D 123/06 |
| 2001/0011118 A1 | 8/2001 | Sanada |
| 2002/0146509 A1 | 10/2002 | Kodokian et al. |
| 2003/0157354 A1 | 8/2003 | Van Veghal et al. |
| 2003/0158341 A1 | 8/2003 | Walton |
| 2003/0191231 A1 | 10/2003 | Martin et al. |
| 2003/0204017 A1 | 10/2003 | Stevens et al. |
| 2004/0024094 A1 | 2/2004 | Stemmler |
| 2004/0027593 A1 | 2/2004 | Wilkins |
| 2004/0242784 A1 | 12/2004 | Tau et al. |
| 2005/0100754 A1 | 5/2005 | Moncla et al. |
| 2005/0271888 A1 | 12/2005 | Moncla et al. |
| 2006/0211781 A1 | 9/2006 | Strandburg et al. |
| 2008/0161487 A1 | 7/2008 | Dorr et al. |
| 2010/0076128 A1 | 3/2010 | Abhari et al. |
| 2010/0143837 A1 | 6/2010 | Klier et al. |
| 2015/0361315 A1 | 12/2015 | Karjala et al. |

FOREIGN PATENT DOCUMENTS

| | | |
|---|---|---|
| EP | 0696244 | 2/1996 |
| EP | 1718318 | 6/1996 |
| EP | 0760828 | 3/1997 |
| EP | 0972794 | 1/2000 |
| EP | 1035166 | 9/2000 |
| EP | 1193282 | 4/2002 |
| EP | 1245603 | 10/2002 |
| EP | 1260547 | 11/2002 |
| EP | 1312654 | 5/2003 |
| EP | 1394202 | 3/2004 |
| EP | 1743924 | 1/2007 |
| JP | 02-26631 | 1/1990 |
| JP | 05-105791 | 4/1993 |
| JP | 2002047444 | 2/2002 |
| JP | 2008239691 | 10/2008 |
| WO | 1991005085 | 4/1991 |
| WO | 9200333 | 1/1992 |
| WO | 1994005495 | 3/1994 |
| WO | 9523038 | 8/1995 |
| WO | 0001745 | 1/2000 |
| WO | 0164774 | 9/2001 |
| WO | 0206275 | 1/2002 |
| WO | 0262875 | 8/2002 |
| WO | 0264856 | 8/2002 |
| WO | 0281205 | 10/2002 |
| WO | 0283753 | 10/2002 |
| WO | 0325058 | 3/2003 |
| WO | 0327170 | 4/2003 |
| WO | 0340201 | 5/2003 |
| WO | 0393355 | 11/2003 |
| WO | 0521622 | 3/2005 |
| WO | 0526275 | 3/2005 |
| WO | 0590427 | 9/2005 |
| WO | 2006119770 | 11/2006 |
| WO | 2011011705 | 1/2011 |
| WO | 2011011707 | 1/2011 |
| WO | 2011142949 | 11/2011 |
| WO | 2012091806 | 7/2012 |

OTHER PUBLICATIONS

International Search Report from related PCT Application PCT/US2005/006493 dated May 31, 2005.

(56) References Cited

OTHER PUBLICATIONS

Randall, "A Review of High Resolution Liquid 13 Carbon Nuclear Magnetic Resonance Characterizations of Ethylene-Based Polymers" JMS-REV, Journal of Macromolecular Science, Part C: Polymer Reviews, 1989, pp. 201-317.

Scholte, et al. "Mark-Houwink Equation and GPC Calibration for Linear Short-Chain Branched Polyolefins, Including Polypropylene and Ethylene-Propylene Copolymers", Journal of Applied Science, vol. 29, 1984, pp. 3763-3782.

Otocka, et al. "Distribution of Long and Short Branches in Low Density Polyethylenes", Macromolecules, vol. 4, No. 4, 1971, pp. 507-512.

International Search Report from related PCT Application PCT/US2011/026878 dated Oct. 25, 2011, 4 pages.

Wicks, et al. "Organic Coatings" Science and Technology, 2nd edition, 1999, pp. 246-257.

Jenkins, et al. Multi-Layer Films, Packaging Foods with Plastics, 1991, pp. 19-27.

Butler, "Coextrusion", Coextrusion Basics, 1992, Chapter 4, pp. 31-80.

Williams, et al. "The Construction of a Polyethylene calibration Curve for Gel Permeation Chromatography using Polystryrene Fractions", Journal of Polymer Science, Polymer Letters, vol. 6, 1968, pp. 621-624.

Wild, et al. "Determination of Branching Distributions in Polyethylene and Ethylene Copolymers", Journal of Polymer Science, vol. 20, 1982, pp. 441-455.

Houben-Weyl, "Methoden der Organischen Chemie, Band E20", Makromolekulare Soffe, Polyester, 1987, pp. 1405-1429.

\* cited by examiner

COATING COMPOSITION AND ARTICLES MADE THEREFROM

This application is a National Stage Application under 35 U.S.C. § 371 of International Application Number PCT/US2013/075071, filed Dec. 13, 2013 and published as WO 2014/105466 on Jul. 3, 2014, which claims the benefit to U.S. Continuation In Part application Ser. No. 13/729,073, filed Dec. 28, 2012, published as US Publication No. 2013/0149453 on Jun. 13, 2013, and granted and assigned U.S. Pat. No. 8,722,787 on May 13, 2014, the entire contents of which are incorporated herein by reference in its entirety.

FIELD OF INVENTION

The instant invention relates to a coating composition and articles made therefrom.

BACKGROUND OF THE INVENTION

The application of various treatment and pretreatment solutions to metals to retard or inhibit corrosion is well established. This is particularly true in the area of metal food and beverage cans as well as non-food metal containers. Coatings are applied to the interior of such containers to prevent the contents from contacting the metal parts of the container. Contact between the metal and the food or beverage as well as non-food substances can lead to corrosion of the metal container, which can then contaminate the food or beverage or the non-food contents of such metal containers. Corrosion is particularly problematic when food and beverage products are highly acidic nature and/or are having a high salt content such as a rhubarb-based products or isotonic drinks. Also strong alkaline contents of non-food substances such as hair-dye may react with metal, for example, aluminum, parts of containers. The coatings applied, for example, to the interior of food and beverage cans also helps prevent corrosion in the head space of the cans, which is the area between the fill line of the food product and the can lid. The coatings may be applied to the outside of metal containers to provide protection against the external environment or to provide a decorative layer including fillers and/or pigments. In addition to corrosion protection, coatings for food and beverage cans should be non-toxic and inert, and, if applied to the internal surface, should not adversely affect the taste or appearance, e.g. color, of the food or beverage in the can or contribute to a contamination of the contents of the can. Resistance to "popping", "blushing" and/or "blistering" is also desired. Certain coatings are particularly applicable for application onto coiled metal stock, such as the coiled metal stock from which the ends of cans are made, "can end stock" and valve cups, e.g. top ends of aerosol cans. Since coatings designed for use on can end stock are applied prior to the ends being cut and stamped out of the coiled metal stock, they are also typically flexible and/or extensible. For example, can end stock is typically coated on both sides. Thereafter, the coated metal stock is punched and may be beaded or bent. It may also be scored for the "pop-top" opening and the pop-top ring is then attached with a pin that is separately fabricated. The end is then attached to the can body by an edge rolling process. Accordingly, the coating applied to the can end stock typically has a certain degree of toughness and flexibility, such that it can withstand extensive fabrication processes, in addition to some or all of the other desirable features discussed above. Various coatings such as epoxy-based and polyvinyl chloride-based, e.g. organosol type, coatings have been used in the past to coat the interior of metal cans to prevent corrosion. However, there is a need for food and beverage can liners as well as non-food container liners that provide improved properties such as having resistance to degradation in corrosive media as well as appropriate level of flexibility.

SUMMARY OF THE INVENTION

The present disclosure provides for a coating composition that includes 40 to 80 weight percent (wt. %) of a base polymer; 5 to 15 wt. % of a polymeric coupling agent; 10 to 30 wt. % of a polymeric stabilizing agent; 0 to 35 wt. % of a polymeric performance improving agent; a neutralizing agent that partially or fully neutralizes the polymeric stabilizing agent; and a fluid medium, where the percent values are based on the total weight of the base polymer, the polymeric coupling agent, the polymeric stabilizing agent and, when present, the polymeric performance improving agent of the coating composition and sum to a value of 100 wt. %.

For the embodiments of the present disclosure, the base polymer can be selected from the group consisting of a non-functionalized ethylene polymer, a non-functionalized propylene polymer, a non-functionalized propylene/ethylene copolymer, and a combination thereof. For example, the non-functionalized ethylene polymer can be selected from the group consisting of polyethylene, a polyethylene-copolymer and a combination thereof. The non-functionalized ethylene polymer, non-functionalized propylene polymer, or non-functionalized ethylene/propylene copolymer can have a crystalline melting point of 100° C. to 230° C. For the embodiments of the present disclosure, the base polymer can also be a non-functionalized propylene polymer.

For the embodiments of the present disclosure, the polymeric stabilizing agent can be an ethylene-acrylic acid and ethylene-methacrylic acid copolymer having a functionality in a range of 10 wt. % to 25 wt. %. The polymeric coupling agent can be selected from the group consisting of a functionalized polypropylene, a functionalized polyethylene homopolymer, a copolymer that has been modified with carboxylic acid groups, a copolymer that has been modified with anhydride groups and a combination thereof. The polymeric performance improving agent can be selected from the group consisting of functionalized polyethylene, functionalized polypropylene, non-functionalized copolymer of ethylene and propylene and a combination thereof. The neutralizing agent can be a volatile base. For embodiments of the present disclosure, the volatile base can be N,N-dimethylethanolamine.

For the embodiments of the present disclosure, the coating composition can be used to form a coating layer. In one embodiment, the coating layer is on a substrate. The substrate can be selected from the group consisting of a metal, a polyurethane, a cured epoxy, a cement or a combination thereof.

Embodiments of the present disclosure also include a method of forming a coating layer that includes applying a coating composition to a substrate, where the coating composition includes: 40 to 80 weight percent (wt. %) of a base polymer; 5 to 15 wt. % of a polymeric coupling agent; 10 to 30 wt. % of a polymeric stabilizing agent; 0 to 35 wt. % of a polymeric performance improving agent; a neutralizing agent that partially or fully neutralize the polymeric stabilizing agent; and a fluid medium, where the percent values are based on the total weight of the base polymer, the polymeric coupling agent, the polymeric stabilizing agent and, when present, the polymeric performance improving agent of the coating composition and sum to a value of 100 wt. %; and drying the coating composition on the substrate to form the coating layer.

DETAILED DESCRIPTION OF THE INVENTION

The instant invention provides an aqueous dispersion, a coating composition, coating layers and coated article made therefrom.

In one embodiment, the instant invention provides an aqueous dispersion comprising the melt blending product of: (a) from 50 to 99 percent by weight of one or more first polyesters, based on the total solid content of the dispersion, wherein said one or more first polyesters have an acid number in the range of from less than 15, for example less than 10, or in the alternative less than 5, based on the total solid content of the first polyester; (b) from 1 to 50 percent by weight of one or more stabilizing agents comprising at least one second polyester, based on the total solid content of the dispersion, wherein said second polyester has a carboxylic acid group and an acid number greater than 15, for example greater than 20, based on the solid content of the second polyester; (c) one or more neutralizing agents; and (d) from 15 to 90 percent by weight of water, based on the total weight of the dispersion; wherein said dispersion has a solid content of 10 to 85 percent, based on the total weight of the dispersion.

In an alternative embodiment, the instant invention further provides a method for producing a aqueous dispersion comprising the steps of: (1) selecting one or more first polyesters having an acid number in the range of from less than 15, for example less than 10, or in the alternative less than 5, based on the total solid content of the first polyester; (2) selecting one or more stabilizing agents comprising at least one second polyester having an acid number greater than 15, for example greater than 20, based on the total solid content of the second polyester; (3) selecting one or more neutralizing agents; (4) melt-blending said one or more first polyesters, one or more stabilizing agents in the presence of water and one or more neutralizing agents; (4) thereby producing an aqueous dispersion having a solid content of 10 to 85 percent, based on the total weight of the dispersion.

In another alternative embodiment, the instant invention further provides a coating composition comprising: (a) the inventive aqueous dispersion, as described hereinabove; (b) one or more cross-linking agents; (c) optionally one or more selected from the group consisting of a polyolefin dispersion, acrylic latex, epoxy resin dispersion, polyurethane dispersion, alkyd dispersion, vinyl acetate dispersion, and ethylene vinyl acetate dispersion.

In another alternative embodiment, the instant invention further provides a coating layer comprising at least one or more film layers derived from the inventive coating composition, as described hereinabove.

In another alternative embodiment, the instant invention further provides a coated article comprising: (1) one or more substrates; (2) at least one or more coating layers derived from the inventive coating composition, as described hereinabove.

In another alternative embodiment, the instant invention further provides a method for making a coated article comprising the steps of: (1) selecting a substrate; (2) selecting the inventive coating composition, as described hereinabove; (3) applying said coating composition to at least one surface of said substrate; (4) removing at least a portion of the water from said the coating composition; (5) thereby forming one or more coating layers associated with said substrate; and (6) thereby forming said coated substrate into a coated article.

In another alternative embodiment, the instant invention further provides a method for making a coated article comprising the steps of: (1) selecting a substrate; (2) forming said substrate into article; (3) selecting the coating composition, as described hereinabove; (4) applying said the coating composition to at least one surface of said article; (5) removing at least a portion of the water from said the coating composition; (6) thereby forming one or more coating layers associated with at least one surface of said article; and (7) thereby forming said coated article.

In an alternative embodiment, the instant invention provides an aqueous dispersion, a coating composition, a coating layer, a coated article, method of producing the same, in accordance with any of the preceding embodiments, except that the first polyester has a glass transition temperature ($T_g$) of at least 30° C.; for example at least 40° C.; or in the alternative, at least 50° C.; or in the alternative, at least 60° C.; or in the alternative, at least 70° C.

In an alternative embodiment, the instant invention provides an aqueous dispersion, a coating composition, a coating layer, a coated article, method of producing the same, in accordance with any of the preceding embodiments, except that the substrate is a pre-coated substrate.

In an alternative embodiment, the instant invention provides an aqueous dispersion, a coating composition, a coating layer, a coated article, method of producing the same, in accordance with any of the preceding embodiments, except that the substrate is metal, wood, paper, plastic, glass, leather, and/or concrete.

In an alternative embodiment, the instant invention provides an aqueous dispersion, a coating composition, a coating layer, a coated article, method of producing the same, in accordance with any of the preceding embodiments, except that the dispersion and/or the coating composition derived therefrom further comprises a catalyst.

In an alternative embodiment, the instant invention provides an aqueous dispersion, a coating composition, a coating layer, a coated article, method of producing the same, in accordance with any of the preceding embodiments, except that the first polyester is a linear saturated aromatic polyester with a glass transition temperature of greater than 50° C. and an acid number of less than 5 mg KOH/g, and the second polyester is compatible with the first polyester, such that a dispersion with a volume average particle size of less than 5 microns is produced.

In an alternative embodiment, the instant invention provides an aqueous dispersion, a coating composition, a coating layer, a coated article, method of producing the same, in accordance with any of the preceding embodiments, except that the aqueous dispersion and/or the coating compositions derived therefrom further comprise one or more binder compositions such as acrylic latex, vinyl acrylic latex, styrene acrylic latex, vinyl acetate ethylene latex, polyurethane dispersion, alkyd dispersion, epoxy dispersion, polyolefin dispersion, and combinations thereof; optionally one or more fillers; optionally one or more additives such as catalysts, wetting agents, defoamers, flow agents, release agents, slip agents, anti-blocking agents, additives to mask sulfur staining, pigment wetting/dispersion agents, anti-settling agents, UV stabilizers, adhesion promoters; optionally one or more lubricants such as fatty acid ester wax, silicon-based wax, fluorine-based wax, polyethylene or any other similar polyolefin wax, carnauba wax, lanolin wax or the like; optionally one or more corrosion inhibitors such as aluminum, and zinc: optionally one or more pigments, e.g. titanium dioxide, barium sulfate, mica, calcium carbonate, silica, zinc oxide, milled glass, aluminum trihydrate, talc, antimony trioxide, fly ash, and clay or the like; optionally one or more co-solvents, e.g. glycols, glycol ether, 2,2,4-trimethyl-1,3-pentanediol monoisobutyrate, alcohols, mineral spirits, aromatic solvents and benzoate esters or the like; optionally one or more dispersants, e.g. aminoalcohols, and polycarboxylates; optionally one or more surfactants; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or optionally one or more additional neutralizing agents, e.g. hydroxides, amines, ammonia, and carbonates; optionally one or more solvents or coalescing agents.

Aqueous Dispersion

The aqueous dispersion according to the present invention comprises the melt blending product of: (a) from 50 to 99 percent by weight of one or more first polyesters, based on the total solid content of the dispersion, wherein said one or more first polyesters have an acid number in the range of from less than 15, for example less than 10, or in the alternative less than 5, based on the total solid content of the first polyester; (b) from 1 to 50 percent by weight of one or more stabilizing agents comprising at least one second polyester, based on the total solid content of the dispersion, wherein said second polyester has a carboxylic acid group and an acid number equal to or greater than 15, for example greater than 20, based on the solid content of the second polyester; (c) one or more neutralizing agents; and (d) from 15 to 90 percent by weight of water, based on the total weight of the dispersion; wherein said dispersion has a solid content of 10 to 85 percent, based on the total weight of the dispersion.

First Polyester

The aqueous dispersion comprises from 50 to 99 percent by weight of one or more first polyesters based on the total weight of the solid content of the aqueous dispersion. All individual values and subranges from 50 to 99 weight percent are included herein and disclosed herein; for example, the weight percent can be from a lower limit of 50, 55, 60, 65, or 70 weight percent to an upper limit of 60, 65, 70, 75, 80, 85, 90, 95, or 99 weight percent. For example, the aqueous dispersion may comprise from 55 to 95 percent by weight of one or more first polyester, based on the total weight of the solid content of the aqueous dispersion; or in the alternative, the aqueous dispersion may comprise from 60 to 90 percent by weight of one or more first polyester, based on the total weight of the solid content of the aqueous dispersion; or in the alternative, the aqueous dispersion may comprise from 65 to 90 percent by weight of one or more first polyester, based on the total weight of the solid content of the aqueous dispersion; or in the alternative, the aqueous dispersion may comprise from 75 to 95 percent by weight of one or more first polyester, based on the total weight of the solid content of the aqueous dispersion. The aqueous dispersion comprises at least one or more first polyesters. The first polyester is a thermosetting polyester. Suitable thermosetting polyesters (hydrophobic polyester) for use in the present invention include, but are not limited to, hydroxyl functional polyesters with medium to high molecular weight (>5000 g/mol Mw, preferably >10,000 g/mol $M_w$, and most preferably >20,000 g/mol $M_w$) polyester. Typically the hydroxyl number of the thermosetting polyester will be at least 3 mg KOH/g (based on resin solids) and preferably at least 5 mg KOH/g. The thermosetting polyester will typically have an acid number of <15 mg KOH/g (based on resin solids), preferably <10 mg KOH/g, and most preferably <5 mg KOH/g. Preferred polyester thermosetting resins have a glass transition temperature ($T_g$) of at least about 30° C., preferably greater than 50° C., and most preferably greater than 70° C.

The hydroxyl functional thermosetting polyester may be formed by conventional polycondensation techniques such as for example described in Zeno W. Wicks, Jr, Frank N. Jones, S. Peter. Pappas, "Organic Coatings, Science and Technology," pp 246-257 (John Wiley & Sons, 1999, second edition) and references therein or in Houben-Weyl, "Methoden der Organischen Chemie, Band E20, Makromolekulare Soffe, Polyester," pp 1405-1429. (Georg Thieme Verlag, Stuttgart 1987) and references therein. In one embodiment, a diol or polyol and a di-carboxylic acid or polycarboxylic acid are charged into a conventional polymerization vessel and reacted between about 150° C. and 280° C. for several hours. Optionally, an esterification catalyst may be used to decrease the reaction time. In general, to ensure the formation of a hydroxyl-group terminated polyester, a small excess of diol may be used. It is also understood that an esterifiable derivative of a polycarboxylic acid, such as a dimethyl ester or anhydride of a polycarboxylic acid, can be used to prepare the polyester.

In one embodiment of the invention, the thermosetting polyester is a linear saturated polyester. However, in some cases it might be desirable to introduce some branching points into the polyester. Triols or polyols or polyacids can be used to provide branched polyesters.

Suitable and typical dicarboxylic acids or polycarboxylic acids, or their corresponding alkyl esters, that may be used to form the thermosetting polyester include saturated as well as unsaturated dicarboxylic acids such as, but not limited to, for example, isophthalic acid, maleic acid, maleic anhydride, malonic acid, fumaric acid, succinic acid, succinic anhydride, glutaric acid, adipic acid, 2-methyl-1,6-hexanoic acid, pimelic acid, suberic acid, dodecanedioic acids, phthalic acid, phthalic anhydride, 5-tert butyl isophthalic acid, tetrahydrophthalic anhydride, hexahydrophthalic acid, hexahydrophthalic anhydride, endomethylenetetrahydrophthalic anhydride, azelaic acid, sebacic acid, tetrachlorophthalic anhydride, chlorendic acid, isophthalic acid, trimellitic anhydride, terephthalic acid, naphthalene dicarboxylic acid, cyclohexane-dicarboxylic acid, dimer fatty acid, or anhydrides of any of these acids, or mixtures thereof.

Suitable diols and polyols that may be used to form the thermosetting polyester include, but are not limited to, for example, ethylene glycol, diethylene glycol, triethylene glycol and higher polyethylene glycols, propylene glycol, dipropylene glycol, tripropylene glycol and higher polypropylene glycols, 1,3-propanediol, 1,4-butanediol and other butanediols, 1,5-pentanediol and other pentane diols, hexanediols, decanediols, and dodecanediols, glycerol, trimethylolpropane, trimethylolethane, neopentyl glycol, pentaerythritol, cyclohexanedimethanol, dipentaerythtritol, 1,2-methyl-1,3-propanediol, 1,4-benzyldimethanol, 2,4-dimethyl-2-ethylhexane-1,3-diol, isopropylidene bis (p-phenylene-oxypropanol-2), 4,4'-dihydroxy-2,2'-diphenylpropane, 1,3-cyclohexanedimethanol, 1,4-cyclohexanedimethanol (or mixtures of 1,3 and 1,4 cyclohexanedimethanol, may be cis or trans), sorbitol, or mixtures thereof.

Suitable thermosetting polyesters are available, for example, from EVONIK under the tradename DYNAPOL®.

In one embodiment, the hydroxyl functional, first polyester, may first be reacted with one or more multi-functional isocyanates such as, for example, isophorone diisocyanate (IPDI), hexamethylene diisocyanate (HDI), dicyclohexylmethane-4,4'-diisocyanate (H12MDI), and 1,3 or 1,4-bis (isocynatomethyl)cyclohexane, or mixtures thereof, to produce a hydroxyl-functional polyester-carbamate polymer.

In another embodiment, the hydroxyl functional, thermosetting polyester may first be reacted with one or more partially blocked isocyanates or polyisocyanates. In a preferred embodiment, the partially blocked isocyanate is a polyisocyanurate compound, such as a trimer, having at least one free isocyanate group. More preferably, the blocked isocyanate has at least two unblocked isocyanate groups. The blocked isocyanate groups of the at least partially blocked polyisocyanate can be any combination of deblockable and/or non-deblockable isocyanate groups. Preferred blocking agents for forming deblockable isocyanate groups include, but are not limited to ε-caprolactam, diisopropylamine (DIPA), methyl ethyl ketoxime (MEKO), and/or mixtures thereof. Preferred blocking agents for forming non-deblockable isocyanate groups include, but are not limited to, glycidol, hydroxyethyl acrylate, alcohols, and glycols. In one preferred embodiment, the deblockable isocyanate groups do not appreciably deblock at a temperature of less than 50° C., more preferably the isocyanate groups do not appreciably deblock at a temperature of less than 100° C.

Stabilizing Agent Comprising a Second Polyester

The aqueous dispersion further comprises at least one or more stabilizing agents comprising one or more second polyesters to promote the formation of a stable dispersion. The second polyester has a carboxylic acid group and an acid number equal to or greater than 15, for example greater than 20. The aqueous dispersion comprises 1 to 50 percent by weight of one or more stabilizing agents, based on the total weight of the solid content of the dispersion. All individual values and subranges from 1 to 50 weight percent are included herein and disclosed herein; for example, the weight percent can be from a lower limit of 1, 3, 5, 10 weight percent to an upper limit of 15, 25, 35, 45, or 50 weight percent. For example, the dispersion may comprise from 1 to 25; or in the alternative, from 1 to 35; or in the alternative, from 1 to 40; or in the alternative, from 1 to 45 percent by weight of one or more stabilizing agents, based on the total weight of the solid content of the dispersion.

The second polyester is a high acid, water dispersible, hydrophilic polyester, which is used as the primary stabilizing agent for dispersing the first polyester resin. The second polyester typically has an acid number in the range of from equal to or greater than 15 mg KOH/g (based on resin solids), for example from 20 to 80 mg KOH/g (based on resin solids). The carboxylic acid functionality of the second polyester is critical to the present invention. In producing the waterborne dispersion, the acid functionality of the second polyester is neutralized with a suitable inorganic or organic base to provide colloidal stability. The high acid stabilizing polyester may also have hydroxyl functionality, but this is not required. Preferably the high acid stabilizing polyester has an OH number of at least 2 mg KOH/g (based on resin solids), preferably 5 mg KOH/g or greater, and most preferably 20 mg KOH/g or greater. The high acid stabilizing polyester may be produced by conventional polycondensation techniques such as for example described in Zeno W. Wicks, Jr, Frank N. Jones, S. Peter. Pappas "Organic Coatings, Science and Technology," pp 246-257 (John Wiley & Sons, 1999, second edition) and references therein or in Houben-Weyl, "Methoden der Organischen Chemie, Band E20, Makromolekulare Soffe, Polyester" pp 1405-1429. (Georg Thieme Verlag, Stuttgart 1987) and references therein. In one embodiment, a diol or polyol and a di-carboxylic acid or polycarboxylic acid are charged into a conventional polymerization vessel and reacted between about 150° C. and 280° C. for several hours. Optionally, an esterification catalyst may be used to decrease the reaction time. It may be preferable to use a two-step process to provide a carboxyl functional polyester. In one embodiment, an OH-functional polyester is first prepared so that there is little, if any, free carboxylic acid and/or carboxylate functions, and which then in a subsequent step is reacted with a cyclic dicarboxylic anhydride, in a ring-opening and monoester-forming reaction, with free carboxylic acid and/or carboxylate groups then being formed. The excess of OH functionality in the resin of the first step is designed in such a way that the final resin, after the reaction with the polyacid functional molecules, will provide a carboxyl terminated polyester resin in which the acid number is typically in the range of from equal to or greater than 15 mg KOH/g (based on resin solids), for example from 20 to 80 mg KOH/g (based on resin solids).

The carboxylic acid component of the high acid stabilizing polyester may contain one or more aliphatic, cycloaliphatic, araliphatic, and/or aromatic carboxylic acids with a COOH functionality of at least two, or anhydrides thereof. Suitable and typical dicarboxylic acids or polycarboxylic acids, or their corresponding alkyl esters, that may be used to form the high acid stabilizing polyester include, but are not limited to, saturated as well as unsaturated dicarboxylic acids such as, for example, but not limited to, maleic acid, maleic anhydride, malonic acid, fumaric acid, succinic acid, succinic anhydride, glutaric acid, adipic acid, 2-methyl-1,6-hexanoic acid, pimelic acid, suberic acid, dodecanedioic acids. phthalic acid, phthalic anhydride, 5-tert butyl isophthalic acid, tetrahydrophthalic anhydride, hexahydrophthalic acid, hexahydrophthalic anhydride, endomethylenetetrahydrophthalic anhydride, azelaic acid, fumaric acid, sebacic acid, tetrachlorophthalic anhydride, chlorendic acid, isophthalic acid, trimellitic anhydride, terephthalic acid, naphthalene dicarboxylic acid, cyclohexane-dicarboxylic acid, and mixtures thereof.

The glycol component of the high acid stabilizing polyester may be ethylene glycol, diethylene glycol, triethylene glycol and/or higher polyethylene glycols, propylene glycol, dipropylene glycol, tripropylene glycol and/or higher polypropylene glycols, 1,3-propanediol, 1,4-butanediol and other butanediols, 1,5-pentanediol and/or other pentane diols, hexanediols, decanediols, and/or dodecanediols, glycerol, trimethylolpropane, trimethylolethane, neopentyl glycol, pentaerythritol, cyclohexanedimethanol, a polyethylene or polypropylene glycol having a molecular weight of about 500 or less, dipentaerythtritol, 1,3-butyleehtylpropanediol, 2-methyl-1,3-propanediol, 1,4-benzyldimethanol, 2,4-dimethyl-2-ethylhexane-1,3-diol, isopropylidene his (p-phenylene-oxypropanol-2), and mixtures thereof. In some embodiments, the aliphatic glycol may contain from 2 to 8 carbon atoms 1,3-cyclohexanedimethanol, 1,4-cyclohexanedimethanol (or mixtures of 1,3 and 1,4 cyclohexanedimethanol, may be cis or trans), 2,2,4,4-tetramethyl-1,3-cyclobutanediol (may be cis, trans, or a mixture thereof) 4,4'-dihydroxy-2,2'-diphenylpropane or mixtures thereof.

The composition of the high acid stabilizing polyester (second polyester) must be chosen so that it exhibits good compatibility with the first polyester. If the compatibility is poor, a good water borne dispersion with small particle size (typically less than about 5 micron volume average particle size diameter) and good stability may not be produced. In addition, resulting coatings from such dispersions may have poor appearance and may show reduced performance in coatings evaluation tests because of lack of compatibility. For example, if an aliphatic, high acid polyester (second polyester) is used to disperse an aromatic, hydrophobic first polyester, a poor dispersion will typically result with large particle size (typically greater than 5 micron volume average particle size diameter). One way to assess compatibility is to melt mix the first polyester and the second polyester at a temperature above their respective melting points. A blend with good compatibility will typically result in a relatively clear or translucent blend, while an incompatible blend will typically result in an opaque or hazy, white melt blend. There may be other methods to determine compatibility such as morphology determination by optical microscopy or transmission electron microscopy of the blend.

In selected embodiments, the stabilizing agent may optionally include a surfactant. Other stabilizing agents that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

Additional stabilizing agents that may be useful in the practice of the present invention include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Stabilizing agents useful in the practice of the present invention can be either external surfactants or internal surfactants. External surfactants are surfactants that do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts. Additional surfactants that may be useful in the practice of the present invention include cationic surfactants, anionic surfactants, non-ionic surfactants, or combinations thereof. Various commercially available surfactants may be used in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS, DISPONIL TA-430, Disponil FES-32, and Diponil FES-993, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Mich., and ESPERSE grades E-100, E-506, E-328, E-355, and E-600, each available from Ethox Chemicals, LLC.

Additional stabilizing agents which could be used are solution or suspension polymers consisting of ethylenically unsaturated monomers such as acrylic and/or methacrylic acid and their ($C_1$-$C_{30}$) esters or amides; acrylamide/methacrylamide and their N-substituted derivatives; acrylonitrile; styrene and substituted styrene derivatives.

Exemplary polymeric stabilizing agents include, but are not limited to, amphiphilic copolymer compositions, the copolymer comprising the reaction product of (i) from 5 to 95 wt. % of one or more hydrophilic monomers and (ii) from 5 to 95 wt. % of one or more copolymerizable ethylenically unsaturated hydrophobic monomers. These materials are water soluble or emulsifiable, especially upon neutralization and can act as colloidal stabilizers. Exemplary stabilizing agents, for example, include, but are not limited to, butylacrylate and laurylmethacrylate.

Representative nonionic, water-soluble monomers suitable for production of amphiphilic copolymer compositions, include, but are not limited to, acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, t-butylacrylamide, N methylolacrylamide, alkyl(meth)acrylates such as methyl(meth)acrylate, butyl acrylate and ethylacrylate, vinyl monomers such as ethylene, styrene, divinylbenzene, di-isobutylethylene, vinyl acetate and N-vinyl pyrrolidone, and allyl monomers such as allyl (meth)acrylate.

Representative cationic, water-soluble monomers suitable for production of amphiphilic copolymer compositions include, but are not limited to, quaternary ammonium salts of amine functionalized monomers such as acrylamide, methacrylamide, N,N-dimethylacrylamide, N,N-diethylacrylamide, N-isopropylacrylamide, N-vinylformamide, N-vinylmethylacetamide, N-vinyl pyrrolidone, t-butylacrylamide, N-methylolacrylamide, tributylammonium ethyl (meth)acrylate TBAEMA, DMAEMA, DMAPMAM, diallyldimethylammonium chloride (DADMAC), methylacrylamidopropyltrimethylammonium chloride (MAPTAC), acrylamidopropyltrimethylammonium chloride (APTAC), N-vinyl pyrrolidone, vinylimidazole, polyquaternium-11 and polyquaternium-4.

"Anionic" or "acid-containing monomer" suitable for production of amphiphilic copolymer compositions include, but are not limited to, ethylenically unsaturated monomers containing carboxylic acid, phosphonic acid, phosphinic acid, sulfinic acid and sulfonic acid groups. Suitable examples include (meth)acrylic acid, maleic acid, succinic acid, itaconic acid, vinyl phosphonic acid and vinylsulfonic acid.

In an alternative embodiment, one or more stabilizing agents may be based on resins such as polyester, epoxy resins, polyamide resins, which might be reacted with acrylic resins or acrylic monomers to form polyester acrylate, polyamide acrylates epoxy resin acrylates.

Polyester acrylates as stabilizing agents may be formed via in-situ polymerization of copolymerizable ethylenically unsaturated monomers in presence of polyesters. Examples include ethylenically unsaturated mono- or polyfunctional acids, ethylenically unsaturated mono- or polyfunctional acid esters, amides, nitriles as well as vinyl monomers and vinyl ester with a polyester in or without presence of a reaction fluid. Polyester acrylates in solvents can be dried according to suitable methods known to those of ordinary skill in the art.

Suitable epoxy resins for producing stabilizing agents may be obtained in accordance with conventional procedures well known to those of ordinary skill in the art by reacting a polyepoxide with a suitable polynucleophile. Suitable epoxides include, but are not limited to, glycidyl ethers, and other epoxy group containing molecules. Suitable polynucleophiles include, but are not limited to, polyhydric phenols, and poly phenols, polythiols, aliphatic polyalcohols or polybasic acids or polyamines. Exemplary suitable epoxies, for example, include, but are not limited to, glycidyl ether that contains at least two glycidyl ether groups per polyglycidyl ether molecule (e.g. an at least diglycidyl ether) with a polyhydric phenol that contains at least two hydroxyl groups in the polyhydric polyphenol (e.g., at least dihydric phenol or a diphenol) in presence of a conventional catalyst at an elevated temperature with or without solvent present. Another class of epoxy resins may be obtained in accordance with conventional procedures well known to those of ordinary skill in the art by reacting, for example, a polyglycidyl ether that contains at least two glycidyl ether groups per polyglycidyl ether molecule (e.g. an at least diglycidyl ether) with a polybasic acid that contains at least two carboxyl groups per polybasic acid molecule (e.g. an at least dibasic polycarboxylic acid) in presence of a conventional catalyst at an elevated temperature with or without solvent present.

Epoxy acrylates for producing stabilizing agents may be formed via in-situ polymerization of copolymerizable ethylenically unsaturated monomers in presence of epoxy resins. Examples include, but are not limited to, ethylenically unsaturated mono- or polyfunctional acids, ethylenically unsaturated mono- or polyfunctional acid esters, amides, nitriles as well as vinyl monomers and vinyl ester with an epoxy resins in or without presence of a reaction fluid. Alternatively a polymeric acid functional acrylic resin can be reacted with an epoxy resin in the presence of a suitable catalyst to form epoxy acrylate. Epoxy acrylates in solvents can be dried according to suitable methods known to those of ordinary skill in the art. In one embodiment an acid functionalized polyester may be used, wherein the epoxy is reacted, for example, with an excess of an acid functional polyester.

Neutralizing Agent

The stabilizing agent may be partially or fully neutralized with a neutralizing agent. In certain embodiments, neutralization of the stabilizing agent, the second polyester, may be from 50 to 250 percent on a molar basis; or in the alternative, it may be from 50 to 200 percent on a molar basis; or in the alternative, it may be from 50 to 150 percent on a molar basis; or in the alternative, it may be from 50 to 120 percent on a molar basis. For example, the neutralizing agent may be a base, such as ammonium hydroxide, sodium hydroxide, or potassium hydroxide. Other neutralizing agents can include lithium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include diethanolamine, triethanolamine, and TRIS AMINO™ (each available from Angus), NEUTROL™ TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethanolamine, diethylamine, triethylamine, mono-n-propylamine, butylamine, dibutylamine, tributylamine, dimethyl benzyl amine, dimethyl n-propylamine, N-methanol amine, N-aminoethylethanolamine, N-methyldiethanolamine, monoisopropanolamine, N,N-dimethyl propanolamine, 2-amino-2-methyl-1-propanol, 1,2-diaminopropane, tris(hydroxymethyl)-aminomethane, ethylenediamine N,N,N'N'-tetrakis(2-hydroxylpropyl) ethylenediamine, N,N,N',N' tetramethylpropanediamine, 3-methoxypropyl amine, imino bis-propyl amine and the like. In some embodiments, mixtures of amines or mixtures of amines and other surfactants may be used. In one embodiment, the neutralizing agent may be a polymeric amine, e.g. diethylene triamine. Those having ordinary skill in the art will appreciate that the selection of an appropriate neutralizing agent depends on the specific composition formulated, and that such a choice is within the knowledge of those of ordinary skill in the art. In one embodiment, amines with boiling points below 250° C. may be used as the neutralizing agents.

Fluid Medium

The aqueous dispersion further comprises a fluid medium. The fluid medium may be any medium; for example, the fluid medium may be water. The aqueous dispersion comprises from 15 to 90 percent by weight of water, based on the weight of the dispersion; for example, the dispersion comprises from 20 to 85 percent by weight of water, based on the weight of the dispersion; or in the alternative from 30 to 75 percent by weight of water, based on the weight of the dispersion; or in the alternative from 40 to 75 percent by weight of water, based on the weight of the dispersion; or in the alternative from 40 to 65 percent by weight of water, based on the weight of the dispersion. Water content of the dispersion may preferably be controlled so that the solids content (one or more first polyesters plus stabilizing agent comprising a second polyester) is in the range of from 10 to 85 percent by weight, based on the weight of the dispersion. For example, the dispersion comprises from 20 to 70 percent by weight of solid contents (one or more first polyesters plus stabilizing agent comprising a second polyester), based on the weight of the dispersion; or in the alternative, from 25 to 70 percent by weight of solid contents (one or more first polyesters plus stabilizing agent comprising a second polyester), based on the weight of the dispersion; or in the alternative, from 35 to 70 percent by weight of solid contents (one or more first polyesters plus stabilizing agent comprising a second polyester), based on the weight of the dispersion; or in the alternative, from 35 to 65 percent by weight of solid contents (one or more first polyesters plus stabilizing agent comprising a second polyester), based on the weight of the dispersion; or in the alternative, from 40 to 70 percent by weight of solid contents (one or more first polyesters plus stabilizing agent comprising a second polyester), based on the weight of the dispersion; or in the alternative, from 40 to 65 percent by weight of solid contents (one or more first polyesters plus stabilizing agent comprising a second polyester), based on the weight of the dispersion; or in the alternative, from 45 to 65 percent by weight of solid contents (one or more first polyesters plus stabilizing agent comprising a second polyester), based on the weight of the dispersion; or in the alternative, from 50 to 70 percent by weight of solid contents (one or more first polyesters plus stabilizing agent comprising a second polyester), based on the weight of the dispersion.

The fluid medium may optionally contain one or more suitable solvents. For example the one or more optional solvents include but are not limited to, e.g. glycols, glycol ether, 2,2,4-trimethyl-1,3-pentanediol monoisobutyrate, alcohols, ketones, glycol ether esters, mineral spirits, aromatic solvents and/or esters or the like; optionally one or more dispersants, e.g. aminoalcohols, and/or polycarboxylates.

Additional Components

The aqueous dispersion of the present invention may optionally be blended with one or more binder compositions such as acrylic latex, vinyl acrylic latex, styrene acrylic latex, vinyl acetate ethylene latex, epoxy dispersion, polyurethane dispersion, alkyd dispersion, polyolefin dispersion, and combinations thereof; optionally one or more fillers; optionally one or more additives such as catalysts, wetting agents, defoamers, flow agents, release agents, slip agents, anti-blocking agents, additives to mask sulfur staining, pigment wetting/dispersion agents, anti-settling agents, UV stabilizers, adhesion promoters; optionally one or more lubricants such as fatty acid ester wax, silicon-based wax, fluorine-based wax, polyethylene or any other similar polyolefin wax, carnauba wax, lanolin wax or the like; optionally one or more corrosion inhibitors such as aluminum, and zinc: optionally one or more pigments, e.g. titanium dioxide, barium sulfate, mica, calcium carbonate, silica, zinc oxide, milled glass, aluminum trihydrate, talc, antimony trioxide, fly ash, and clay or the like; optionally one or more co-solvents, e.g. glycols, glycol ether, 2,2,4-trimethyl-1,3-pentanediol monoisobutyrate, alcohols, mineral spirits, aromatic solvents and benzoate esters or the like; optionally one or more dispersants, e.g. aminoalcohols, and polycarboxylates; optionally one or more surfactants; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or optionally one or more additional neutralizing agents, e.g. hydroxides, amines, ammonia, and carbonates; optionally one or more solvents or coalescing agents.

In addition, the aqueous dispersion may be blended with one or more dispersions, emulsions, suspensions, colloidal suspensions, and the like. For example the aqueous dispersion of the invention may be blended with polyurethane dispersion, alkyd dispersion, epoxy dispersion, vinyl acetate emulsion, acrylic emulsion, polyolefin dispersion, vinyl acetate ethylene emulsion, and/or the like. The addition of the additional components, as described herein, may be achieved as part of the process for making the dispersion, i.e. the additional components are added while producing the aqueous dispersion; or in he alternative, the additional components may added post aqueous dispersion production, i.e. the additional components are added into the aqueous dispersion after the dispersion is produced; or in the alternative, combinations thereof, i.e. additional components may be added during the process for making the dispersion and additionally such additional components are added post dispersion production as well.

Crosslinking Agent

The aqueous dispersion may optionally further comprise at least one or more crosslinking agents to promote crosslinking and or one or more catalyst to increase the rate of crosslinking. Such catalysts are generally known, and the selection of suitable catalyst typically depends on the selection of the crosslinking agent and other factors such as conditions for such crosslinking. Such catalysts include, but are not limited to, depending on type of crosslinker—strong acids, weak acids or compounds containing metals, such as dodecyl benzene sulfonic acid, p-toluene sulfonic acid, di-nonylnaphtalene disulfonic acid, methane sulfonic acid, phosphoric acid or weak acids such as ammonium or phosphonium salts or tin, bismuth, zirconium or aluminum chelate compounds. Exemplary catalysts include, but are not limited to, NACURE™, K-Kure™ and K-Kat™, available from King Industries, CYCAT™ from Cytec Industries, and/or FASCAT™ from Arkema Inc. The aqueous dispersion of the instant invention comprises 0.5 to 50 percent by weight of one or more crosslinking agents, based on the total weight of the solid content of the dispersion. All individual values and subranges from 0.5 to 50 weight percent are included herein and disclosed herein; for example, the weight percent can be from a lower limit of 0.5, 1, 3, 5, 10. 15, or 20 weight percent to an upper limit of 10, 12, 15, 18, 20, 25, 30, 35, 40, 45, or 50 weight percent. For example, the dispersion may comprise from 1 to 18; or in the alternative, from 1 to 15; or in the alternative, from 1 to 12; or in the alternative, from 1 to 10; or in the alternative, from 1 to 20; or in the alternative, from 1 to 30; or in the alternative, from 1 to 40; or in the alternative, from 1 to 45; or in the alternative, from 1 to 50 percent by weight of one or more crosslinking agents, based on the total weight of the solid content of the dispersion. In selected embodiments the crosslinking agent may, for example, be phenol-formaldehyde resins, amino-formaldehyde resins including, but not limited, to urea-formaldehyde resins, melamine formaldehyde resins, benzoguanamine formaldehyde resins, anhydride resins, epoxy group containing resins such as epoxy resins, epoxy group containing polyester or acrylic resins and blocked or un-blocked isocyanate resins, and combinations of two or more thereof, provided that the combinations of such crosslinkers is compatible.

Crosslinking agent may be a compound, which reacts with a reactive functional group contained in the dispersion formulation; thereby facilitating their crosslinking. Such functional groups can be present in both the first polyester as well as the stabilizing agent comprising a second polyester.

For example, reactive functional groups include, but are not limited to, acid groups such as carboxylic acid groups, free or in the neutralized form, or any functional groups having another active hydrogen by another component such as alcohol groups, amino groups, epoxy groups, or the like.

Crosslinkable functional groups in the cross-linking agent are groups capable of reacting with the reactive functional group of the first polyester or the stabilizing agent comprising a second polyester. For example, a carbodiimide group, an oxazoline group, an isocyanate group, an epoxy group, a methylol group, an aldehyde group, an acid anhydride group, a hydroxy group, an aziridinyl group or a silane group can be used in a crosslinker.

Another possibility of crosslinking acid functional groups is by use of multivalent metal ions by reaction of the aforementioned acid groups with a multivalent metal ion containing substance, such as zinc oxide.

Carboxylic acids could also be crosslinked in reactions with multifunctional olefinic unsaturated substances under catalysis of a strong acid. Multifunctional carbonates could also react with carboxylic acids to give ester linkages with liberation of carbon dioxide.

In the alternative, crosslinking may be accomplished via free radical crosslinking, initiated by addition of peroxides or via radiation, e.g., electron beam.

With respect to crosslinkable functional groups, one or more may be present in a crosslinking agent. In the alternative, two or more crosslinkable functional groups may be present in a single molecule.

The cross-linking agent having the above described cross-linkable functional group may be a waterdispersed or waterdispersible or water-soluble substance. In one embodiment, exemplary crosslinking agents include, but are not limited to, an aqueous monomeric or polymeric substance, which contains two or more oxazoline groups, carbodiimide groups, epoxy groups, isocyanate groups, methylol groups etc. or several of these per molecule.

An exemplary oxazoline crosslinking agent is an aqueous polymer having two or more oxazoline groups in its molecules, substances can be obtained by polymerizing an oxazoline group-containing monomer and, as required, an ethylenic unsaturated monomer. Alternatively an oxazoline crosslinking agent can also be obtained by reaction between a nitrile group and an aminoethanol group, dehydration of a hydroxylalkylamide group and the like.

Crosslinking agents having two or more carbodiimide groups can be produced from diisocyanate compounds by a condensation reaction accompanied by decarboxylation reaction of a diisocyanate compound. Examples of the diisocyanate compound include, but are not limited to, 1,5-naphthylene diisocyanate, 4,4'-diphenylmethane diisocyanate, 4,4'-diphenyldimethylmethane diisocyanate, 1,4-phenylene diisocyanate, 2,4-tolylene diisocyanate, 2,6-tolylene diisocyanate, hexanemethylene diisocyanate, cyclohexane-1,4-diisocyanate, xylylene diisocyanate, isophorone diisocyanate, dicyclohexylmethane-4,4'-diisocyanate, methylcyclohexane diisocyanate, and tetramethylxylylene diisocyanate and the like. These compounds may also be used as mixtures.

Monofunctional isocyanates may be included to control the resin molecular chain length such as phenyl isocyanate, tolyl isocyanate, cyclohexylisocyanate, dimethylphenyl isocyanate, butylisocyanate, and naphthyl isocyanate are useful.

Diisocyanate substances may be partially reacted with aliphatic compounds, alicyclic compounds, or aromatic compounds having a hydroxyl group, an imino group, an amino group, a carboxyl group, a mercapto group, an epoxy group, and the like.

In the condensation reaction accompanied by decarboxylation of a diisocyanate compound, a carbodiimidization catalyst can be used. Usable as such a catalyst are, for example, phospholene oxides such as 1-phenyl-2-phospholene-1-oxide, 3-methyl-2-phospholene-1-oxide, 1-ethyl-2-phospholene-1-oxide, and 3-phospholene isomers thereof.

In order to convert a carbodiimide group-containing polymer into an aqueous polymer, a hydrophilic segment is provided in the molecular structure of the carbodiimide group-containing polymer. For example, an aqueous polymer containing a carbodiimide group can be obtained by providing a hydrophilic segment having a functional group which has reactivity with an isocyanate group. Usable as the hydrophilic segment are: quaternary ammonium salts of dialkylamino alkylamine (e.g., quaternary ammonium salts of 2-dimethylaminoethanol); quaternary salts of dialkylamino alkylamine (e.g., 3-dimethylamino-n-propylamine); alkyl sulfonic acid salts having at least one reactive hydroxyl group (e.g., sodiumhydroxypropanesulfonate); a mixture of polyethylene oxide or polyethylene oxide, whose terminal is capped with an alkoxy group, and a polypropylene oxide (e.g., polyethylene oxide whose terminal position is capped with a methoxy group or an ethoxy group).

As an aqueous cross-linking agent containing an epoxy group, there are exemplified sorbitol polyglycidyl ether, glycerol triglycidyl ether, polyglycerol polyglycidylether trimethylolpropane triglycidyl ether, poly(ethyleneglycol) diglycidyl ether, poly(propyleneglycol) diglycidyl ether, phenol ethyleneoxide glycidyl ether, and lauryl alcohol ethyleneoxide glycidyl ether or the like. In addition to the above, mentioned as examples are: a water-soluble epoxy resin obtained by reacting a carboxy compound, which is obtained through a reaction between a polyoxyethylene polyol compound and an acid anhydride compound, and an epoxy resin having two or more epoxy groups in its molecules; and a self-emulsifiable epoxy resin composition obtained by mixing the water-soluble epoxy resin and the epoxy resin having two or more epoxy groups in its molecules. Such resins can be obtained for example under the tradenames of XZ 92533.00, XZ 92598.00 and XZ 92446.00 from The Dow Chemical Company, Midland, Mich. Examples of the anhydride compound include, but not particularly limited to, preferably aromatic anhydrides such as phthalic anhydride, trimellitic anhydride, and pyromellitic anhydride; and cyclic aliphatic anhydrides such as maleic anhydride, succinic anhdyride, tetrahydrophthalic anhydride, methyl tetrahydrophthalic anhydride, methyl nadic anhydride, alkenyl succinic anhdyride, hexahydrophthalic anhydride, and methyl hexahydrophthalic anhydride. There is no limitation on the epoxy resin having two or more epoxy groups in its molecules, and all known epoxy resins with an epoxy functionality of greater or equal to two can be used. Examples are polyglycidyl ether obtained from epichlorohydrin and a polyhydric compound such as, phenol novolac, and cresol novolac bisphenol A, bisphenol F, bisphenol S, resorcinol, hydroquinone or catechol; alkylene oxide-added bisphenol A; polyalcohols such as polypropylene glycol, 1,6-hexanediol, trimethylol propane, glycerin, cyclohexanedimethanol; and polyglycidyl ester and polyglycidyl amine of polycarboxylic acids such as adipic acid, phthalic acid, dimer acid and the like.

Aqueous cross-linking agent containing an isocyanate group are, for example: polyisocyanate mainly containing at least one member selected from the group consisting of an isocyanurate group-containing polyisocyanate, an urethodione group-containing polyisocyanate, an urethodione group/isocyanurate group containing polyisocyanate, an urethane group containing polyisocyanate, an allophanate group containing polyisocyanate, a biuret group containing polyisocyanate, a carbodiimide group containing polyisocyanate, and an uretodione group containing polyisocyanate, each of which contains 1,6-hexamethylene diisocyanate and/or isophorone diisocyanate as a raw material; and a self-emulsifiable polyisocyanate obtained by reacting a hydrophilic surfactant having at least one active hydrogen group which can react with an isocyanate group or polyethylene ether alcohol containing at least three poly-ethylene oxide units with fatty acid ester in which the sum of the number of carbons of fatty acid and a hydroxyl containing compound as raw materials is 8 or more and which has at least one active hydrogen group which can react with an isocyanate group. In addition to the above, an urethane group-containing polyisocyanate obtained by reaction between 1,6-hexamethylenediisocyanate and/or an isophorone diisocyanate and an active hydrogen group-containing compound or polyisocyanate obtained by an allophanatization reaction, carbodiimidization reaction, uretodionization reaction, and biuretization reaction of these diisocyanate compounds can be mentioned.

Examples of suitable crosslinking agents containing an aldehyde are waterdispersed or waterdispersible or water-soluble phenol formaldehyde resins, amino formaldehyde resins or combinations thereof.

Phenol formaldehyde crosslinking agents include, but are not limited to, reaction products of aldehydes with phenols. Preferred aldehdydes but not exclusive are formaldehyde and acetaldehyde. A large variety of phenols can be used such as but not exclusive phenol, cresol, p-phenylphenol, p-tert-butylphenol, p-tert-amylphenol, cyclopentylphenol, cresylic acid, bisphenol-A, bisphenol-F and the like and combinations thereof. Also acid functional phenols could be used in making phenol formaldehyde resins. The crosslinkers can be unetherified or etherified with alcohols or polyols. These phenol formaldehyde resins may be soluble or self-emulsifiable in water or can be stabilized by use of colloid stabilizers such as polyvinyl alcohol.

Amino formaldehyde crosslinking agents include, but are not limited to, reaction products of aldehydes with amino or amido group containing molecules. Exemplary aldehydes include, but are not limited to, formaldehyde and acetaldehyde. A large variety of amino or amido group containing molecules can be used such as but not exclusive urea, melamine, benzoguanamine, acetoguanamine, glycoluril and the like. Suitable amino crosslinking resins include melamine-formaldehyde, urea-formaldehyde, benzoguanamine-formaldehyde, acetoguanamine-formaldehyde, glycoluril-formaldehyde resins. Also the methylol groups of an amino formaldehyde resin can be partially or fully etherified with at least one of the groups of monohydric aliphatic alcohols such as methanol and/or n-butanol. These amino formaldehyde resins may be soluble or self-emulsifiable in water or can be stabilized by use of colloid stabilizers such as polyvinyl alcohol can be used to stabilize the amino formaldehyde dispersions.

Commercially available amino-formaldehyde resins which are water soluble or water dispersible and useful for the instant purpose include Cymel™ 301, Cymel™ 303, Cymel™ 370, and Cymel™ 373 (all being products of Cytec Surface Specialties, Brussels, Belgium). Other aldehydes used to react with the amino compound to form the resinous material are crotonic aldehyde, acrolein, or compounds which generate aldehydes, such as hexamethylene-tetramine, paraldehyde, and the like.

Another class of crosslinking agents for carboxylic acid groups are water-soluble hydroxyalkylamide crosslinkers such as Bis(N,N'-dihydroxyethyl)adipamide and the like. Such compounds are commercially available under the tradename of PRIMID™ crosslinker resins from EMS-PRIMID in Switzerland, for example PRIMID™ XL-522, PRIMID™ SF-4510 and PRIMID™ QM-1260

The one or more crosslinking agents may be added to the aqueous dispersion as part of the aqueous dispersion formulation process; or in the alternative, the one or more crosslinking agents may be added to the aqueous dispersion post dispersion formulation process.

In one embodiment, depending on the type of food or beverage which is to be contained in a coated container, and on required coating properties it may be beneficial to combine several crosslinkers or some crosslinkers may be more suited than others. Some crosslinkers may not be suited for all applications. Some crosslinkers may require the addition of catalysts for proper cure.

Crosslinkers will help to build thermoset networks, which is indicated by higher values of MEK Double Rubs compared to an identical formulation not containing the crosslinker.

Forming the Dispersion

The aqueous dispersion can be formed by any number of methods recognized by those having skill in the art. Dispersion equipment can be operated in batch, semi-batch, or continuous mode. Examples of mixers include rotor-stator, microfluidizer, high pressure homogenizer, ultrasonic, impinging jet, Cowles™ blade, planetary mixers, and melt kneading devices such as extruders.

In one embodiment, one or more first polyesters, one or more stabilizing agents comprising a second polyester are melt-kneaded in an extruder along with water and optionally one or more neutralizing agents, such as ammonia, potassium hydroxide, amine, or a combination of two or more, to form a dispersion. In another embodiment, one or more first polyesters, one or more stabilizing agents comprising a second polyester are compounded, and then melt-kneaded in an extruder in the presence of water, and optionally one or more neutralizing agents thereby forming a dispersion. In some embodiments, the dispersion is first diluted to contain from 1 to 20 percent, e.g., 1 to 5 percent or 1 to 3 percent, by weight of water, and then, subsequently, further diluted to comprise from 15 to 90 percent by weight of water, based on the weight of dispersion. In one embodiment, further dilution may be accomplished via a solvent. In one embodiment, the dispersion is free of any solvent.

Any melt-kneading means known in the art may be used. In some embodiments, a kneader, a BANBURY® mixer, single-screw extruder, or a multi-screw extruder, e.g. a twin screw extruder, melt pump in connection with a rotor stator is used. A process for producing the dispersions in accordance with the present invention is not particularly limited. For example, an extruder, in certain embodiments, for example, a twin screw extruder, is coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used, but in some embodiments, for example, a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater.

One or more first polyesters, in the form of, for example, pellets, powder, or flakes, are fed from the feeder to an inlet of the extruder where the resin is melted or compounded. One or more additional components may optionally be fed simultaneously with one or more first polyesters into the extruder via the feeder; or in the alternative, one or more additional components may be compounded into one or more first polyesters, and then fed into the extruder via the feeder. In the alternative, additional one or more additional components may optionally further be metered via an inlet prior to the emulsification zone into the molten compound comprising one or more first polyesters. In some embodiments, the stabilizing agent comprising a second polyester is added to one or more first polyesters through and along with the first polyesters and in other embodiments, the stabilizing agent comprising a second polyester is provided separately to the twin screw extruder. The resin melt is then delivered from the mix and convey zone to an emulsification zone of the extruder where the initial amount of water and base from the water and base reservoirs are added through an inlet. In some embodiments, stabilizing agent comprising a second polyester may be added additionally or exclusively to the water stream. In some embodiments, further dilution water may be added via water inlet from water reservoir in a dilution and cooling zone of the extruder. Typically, the dispersion is diluted to at least 30 weight percent water in the cooling zone. In addition, the diluted mixture may be diluted any number of times until the desired dilution level is achieved. In some embodiments, the dispersion is further cooled after exiting the extruder by the use of a suitable heat exchanger. In other embodiments, water is not added into the twin screw extruder but rather to a stream containing the resin melt after the melt has exited from the extruder. In this manner, steam pressure build-up in the extruder is eliminated and the dispersion is formed in a secondary mixing device such as a rotor stator mixer.

In another embodiment, the aqueous dispersion can be formed in a continuous high shear mixer without the use of a melt kneading extruder. In this embodiment, the first stream comprising one or more liquid or molten first polyesters is supplied to a continuous high shear mixer from a suitable liquid pump for example, a syringe pump, gear pump, or progressive cavity pump. The first stream is flowed through a first conduit and merged continuously with a second stream containing a continuous aqueous phase that is flowed through a second conduit. The first and second streams are merged into a disperser in the presence of a stabilizing agent comprising a second polyester with optional neutralizing agent. The agents can be added to either the first or second stream, or as a separate stream. A third stream comprising water can be added downstream from the disperser. The flow rates of the streams are adjusted to achieve a dispersion having the desired amount of polymer phase and percent solids. The disperser can be any one of a number of continuous inline mixers, for example, an IKA high-shear mixer, Oakes rotor stator mixer, Ross mixer, Silverson mixer, or centrifugal pump. The rpm setting of the disperser can be used to help control the particle size of the dispersed hydrophobic phase in the dispersion. The system can be heated to provide the polymer and neutralizer components at a suitable viscosity for pumping. Steam formation is reduced by controlling the pressure through the use of a backpressure regulator, gear pump, metering pump, or other suitable device near the exit of the process. In some embodiments, the dispersion is further cooled after exiting the disperser by the use of a suitable heat exchanger.

In another embodiment, the aqueous dispersion can be formed in a batch or semi-batch high shear mixer where the mixer may, for example, be disposed within a pressurized tank to, for example, reduce steam formation. All or at least a portion of the dispersion is removed from the tank during processing, and optionally cooled by the use of a suitable heat exchanger.

During the preparation of the aqueous dispersion, optionally one or more fillers; optionally one or more additives such as catalysts, wetting agents, defoamers, flow agents, release agents, slip agents, anti-blocking agents, additives to mask sulfur staining, pigment wetting/dispersion agents, anti-settling agents, UV stabilizers, adhesion promoters; optionally one or more lubricants such as fatty acid ester wax, silicon-based wax, fluorine-based wax, polyethylene or any other similar polyolefin wax, carnauba wax, lanolin wax or the like; optionally one or more corrosion inhibitors such as aluminum, and zinc: optionally one or more pigments, e.g. titanium dioxide, mica, calcium carbonate, barium sulfate, silica, zinc oxide, milled glass, aluminum trihydrate, talc, antimony trioxide, fly ash, and clay or the like; optionally one or more dyes; optionally one or more co-solvents, e.g. glycols, glycol ether, 2,2,4-trimethyl-1,3-pentanediol monoisobutyrate, alcohols, mineral spirits, and benzoate esters or the like; optionally one or more dispersants, e.g. aminoalcohols, and polycarboxylates; optionally one or more surfactants; optionally one or more defoamers; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or optionally one or more additional neutralizing agents, e.g. hydroxides, amines, ammonia, and carbonates may be added to the aqueous dispersion formulation; or in the alternative, may be added to the dispersion post dispersion formulation process.

During the preparation of the aqueous dispersion, one or more crosslinking agents may also be added to the aqueous dispersion formulation; or in the alternative, may be added to the dispersion post dispersion formulation process.

Optionally during the dispersion of the one or more first polyesters, another polymer dispersion or emulsion may be used as a portion of the aqueous phase of the dispersion. Examples include, but are not limited to, acrylic, epoxy, polyester, polyurethane, polyolefin, polyamide, alkyd, and the like containing dispersions, emulsions, suspensions, colloidal suspensions.

In one embodiment, the method for producing the inventive aqueous dispersion comprises the steps of: (1) selecting one or more first polyesters having an acid number in the range of from less than 15, for example less than 10, or in the alternative less than 5; (2) selecting one or more stabilizing agents comprising at least one second polyester having an acid number equal to or greater than 15, for example greater than 20; (3) selecting one or more neutralizing agents; (4) melt-blending said one or more first polyesters, one or more stabilizing agents in the presence of water and one or more neutralizing agents; (4) thereby producing an aqueous dispersion having a solid content of 10 to 74 percent, based on the total weight of the dispersion.

Coating Applications and Forming Coated Containers or Closure Devices

The aqueous dispersion and/or coating composition derived therefrom may be used on any suitable substrate including, but not limited to metal, wood, paper, plastic, leather, glass, concrete, and the like. In one embodiment the aqueous dispersion and/or coating derived therefrom may be used, for example, in container, e.g. can, coating application, or closure device coating application. Such coated container devices include, but are not limited to, cans such as beverage cans, food cans; aerosol containers such as those for nonfood products, e.g. hair spray, hair dye, or color spray lacquers; drums; kegs; pails; decorative tins; open trays; tubes, bottles, monoblocs, and the like. The coated articles such as closure devices include, but are not limited to, caps, lids such as thin aluminum foil based lids for yogurt and butter containers, or crown corks; closures for glass jars and bottles such as roll-on closures, vacuum closures, pilferproof closures, easy peel lids for can closures, and easy open end or conventional ends for cans. Cans may be 2 piece cans or 3 piece cans. Beverage cans include, but are not limited to, beer cans, carbonated soft drink cans, energy drink cans, isotonic drink cans, water cans, juice cans, tea cans, coffee cans, milk cans, and the like. Food cans, include, but are not limited to, vegetable cans, fruit cans, meat cans, soup cans, ready meal cans, fish cans, edible oil cans, sauce cans and the like. Such cans may have any shapes; for example, such can may have a cylindrical shape, cubical, spherical, semispherical, bottle shape, elongated cubical shape, shallow or tall shape, round or rectangular shape or any other suitable shape. The coated articles such as container devices according to the instant invention may be formed via any conventional method. For example, the coated container device may be formed via stamping, drawing, redrawing, wall ironing, bending, beading, embossing, debossing, flanging, necking, stretching, blow-stretching and any other suitable conventional method. Such methods are generally known to those having ordinary skill in the art. The aqueous dispersion and/or coating composition derived therefrom may, for example, be applied to a substrate, e.g. metal sheet or metal foil, and then the coated substrate may be formed into a coated container device or a coated closure device. In the alternative, a substrate may be formed into a container device or a closure device, and then the container device or the closure device is coated with one or more aqueous dispersions and/or coating composition derived therefrom to form the coated container device or coated closure device. The coating may be applied via any method; for example, via roller coating, spray coating, powder coating, dip coating, electrodeposition coating, printing, wash coating, flow coating, curtain coating.

The substrate comprises one or more metals including, but not limited to, aluminum and aluminum alloys, electrolytic tinplate cold rolled low carbon mild steel ("ETP"), electrolytic chromium/chromium oxide coated cold rolled low carbon mild steel (ECCS), and any other pre-treated steel, or one or more polymers such as one or more polyolefins, e.g. polyethylene and/or polypropylene. Pretreatment may include, but is not limited to, treatment with phosphoric acid, zirconium phosphate, chromium phosphate, and the like as well as silanes for reasons such as primary corrosion protection and improved adhesion. The substrate may comprise a sheet, strip or a coil. The substrate may comprise one or more layers, and each layer may have a thickness in the range of from 0.01 μm to 2 mm; for example, from 0.01 μm to 1.5 mm; or in the alternative, from 0.01 μm to 1 mm; or in the alternative, from 0.01 μm to 0.5 mm; or in the alternative, from 0.01 μm to 0.2 mm; or in the alternative, from 0.01 μm to 0.1 mm or in the alternative, from 0.01 μm to 100 μm; or in the alternative, from 0.01 μm to 50 μm; or in the alternative, from 1 μm to 50 μm; or in the alternative, from 1 μm to 15 μm. The substrate may be pre-coated with one or more pre-coating compositions. Such pre-coating compositions may optionally further include, but are not limited to, one or more resin binders, one or more resin crosslinkers, one or more solvents, one or more additives, and one or more pigments. Exemplary resin binders include, but are not limited to, epoxy, polyester, polyvinyl chloride containing organosols/vinyls, phenolic, alkyd, oleoresin, acrylic resin, and the like. Exemplary crosslinkers include, but are not limited to, phenol-formaldehyde resins; amino-formaldehyde resins including but not limited to urea-formaldehyde, melamine formaldehyde, benzoguanamine formaldehyde; anhydride resins, blocked isocyanate resins and epoxy groups containing resins, including but not limited to, epoxy resins, epoxy groups containing polyesters, acrylic resins, vinyl resins or the like. Exemplary solvents and thinners include, but are not limited to, glycol ethers, alcohols, aromatics, e.g. aromatic hydrocarbons, white spirit, branched ketones and esters. Exemplary additives include, but are not limited to, catalysts, lubricants, wetting agents, defoamers, flow agents, release agents, slip agents, anti-blocking agents, additives to mask sulfur staining, pigment wetting/dispersion agents, anti-settling agents, UV stabilizers, adhesion promoters. Pigments include, but are not limited to titanium dioxide, zinc oxide, aluminum oxide, zinc and aluminum. The substrate may also be pre-coated with one or more pre-coated laminate compositions. Such compositions may, for example, include polyethylene, polypropylene, or polyester compositions, and may be applied either as a film via film lamination process or melt-extrusion coating process onto the metal surface.

The one or more aqueous dispersions and/or coating composition derived therefrom applied to the at least one surface of the substrate may be dried via any conventional drying method. Such conventional drying methods include but, are not limited to, air drying, convection oven drying, hot air drying, and/or infrared oven drying. During the drying process, crosslinking of one or more base polymers, stabilizing agents, or combinations thereof, involving one or more the crosslinking agents, may occur. Additional cure might occur by radiation cure, e.g. electron-beam cure. The one or more aqueous dispersions and/or coating composition derived therefrom applied to the at least one surface of the substrate may be dried at any temperature; for example, it may be dried at a temperature in the range of equal or greater than the melting point temperature of the first polyester; or in the alternative, it may be dried at a temperature in the range of less than the melting point of the stabilizing agent comprising a second polyester. The one or more aqueous dispersions and/or coating composition derived therefrom applied to the at least one surface of the substrate may be dried at a temperature in the range of about 60° F. (15.5° C.) to about 700° F. (371° C.) for a period of less than about 40 minutes, for example, less than 20 minutes, or less than 10 minutes, or less than 5 minutes, or less than 2 minutes, or less than 1 minute, or less than 20 seconds. All individual values and subranges from about 60° F. (15.5° C.) to about 700° F. (371° C.) are included herein and disclosed herein; for example, the one or more aqueous dispersions and/or coating composition derived therefrom applied to the at least one surface of the substrate may be dried at a temperature in the range of about 60° F. (15.5° C.) to about 500° F. (260° C.) for a period of less than about 40 minutes, for example, less than 20 minutes, or less than 10 minutes, or less than 5 minutes, or less than 2 minutes, or less than 1 minute, or in the alternative, the one or more aqueous dispersions and/or coating composition derived therefrom applied to the at least one surface of the substrate may be dried at a temperature in the range of about 60° F. (15.5° C.) to about 450° F. (232.2° C.) for a period of less than about 40 minutes, for example, less than 20 minutes, or less than 10 minutes, or less than 5 minutes, or less than 2 minutes, or less than 1 minute. The temperature of the one or more aqueous dispersions and/or coating composition derived therefrom applied to the at least one surface of the substrate may be raised to a temperature in the range of equal or greater than the melting point temperature of the base polymer for a period of less than about 40 minutes. All individual values and subranges from less than about 40 minutes are included herein and disclosed herein; for example, the temperature of the one or more aqueous dispersions and/or coating composition derived therefrom applied to the at least one surface of the substrate may be raised to a temperature in the range of equal or greater than the melting point temperature of the first polyester for a period of less than about 20 minutes, or in the alternative, the temperature of the one or more aqueous dispersions applied and/or coating composition derived therefrom to the at least one surface of the substrate may be raised to a temperature in the range of equal or greater than the melting point temperature of the first polyester for a period of less than about 5 minutes, or in another alternative, the temperature of the one or more aqueous dispersions and/or coating composition derived therefrom applied to the at least one surface of the substrate may be raised to a temperature in the range of equal or greater than the melting point temperature of the first polyester for a period in the range of about 0.5 to 300 seconds. In another alternative, the temperature of the one or more aqueous dispersions and/or coating composition derived therefrom applied to the at least one surface of the substrate may be raised to a temperature in the range of less than the melting point temperature of the first polyester for a period of less than 40 minutes. All individual values and subranges from less than about 40 minutes are included herein and disclosed herein; for example, the temperature of the one or more aqueous dispersions and/or coating composition derived therefrom applied to the at least one surface of the substrate may be raised to a temperature in the range of less than the melting point temperature of the first polyester for a period of less than about 20 minutes, or in the alternative, the temperature of the one or more aqueous dispersions and/or coating composition derived therefrom applied to the at least one surface of the substrate may be raised to a temperature in the range of less than the melting point temperature of the first polyester for a period of less than about 5 minutes, or in another alternative, the temperature of the one or more aqueous dispersions applied and/or coating composition derived therefrom to the at least one surface of the substrate may be raised to a temperature in the range of less than the melting point temperature of the first polyester for a period in the range of about 0.5 to 300 seconds.

The coated substrate may further be coated with one or more conventional coating compositions, or it may further be laminated to one or more other layers. Such conventional coating compositions are generally known to person of ordinary skill in the art, and they may include, but are not limited to, epoxy resin coating compositions, acrylate based coating compositions, and polyester based coating compositions. The lamination process is generally known, and exemplary lamination layers may include, but are not limited to, polyester laminates, polyolefin based laminates such as polypropylene laminates.

The one or more aqueous dispersions and/or coating composition derived therefrom applied to at least one surface of a substrate, for example a pre-coated substrate, as one or more crosslinked coating layers may have a cross cut adhesion, before retort, rating of at least 3B; for example, 4 B or 5B, measured according to ASTM-D 3359-08. The one or more aqueous dispersions and/or coating composition derived therefrom applied to at least one surface of a substrate as one or more crosslinked coating layers may have a wedge bend pass rating of at least 50 percent, for example, at least 70 percent, or in the alternative, at least 80 percent, or in the alternative, at least 90 percent, measured via a Gardner "COVERALL" Bend Tester IG 1125.

The present disclosure further includes a waterborne polyolefin based coating layer that has improved features as compared to epoxy coatings. Epoxy coatings are useful in metal coatings for industrial applications (i.e. tank liner, coil, and pipe coatings, among others). For example, epoxy coatings, due to their highly cross-linked structure, have very good acid and base resistance. Their highly cross-linked structure also results in the epoxy coatings having a fairly rigid film. This rigid film, however, is not very durable (not very damage tolerant). For example, temperature cycling can impart significant stresses on epoxy coatings due to thermal expansion and contraction of both the epoxy coating and the underlying substrate (e.g., a metal tank). Eventually, the thermal expansion and contraction of these structures results in failure of the epoxy coating. Additionally, impacting the coating, or flexing the coating may result in failure of the film integrity.

The coating layer of the present disclosure, in contrast to epoxy coatings, provides for a coating layer having excellent acid and base resistance, good adhesion to metal substrates, and good flexibility. For example, as provided in the Examples section, coating layers formed with the coating composition of the present disclosure can survive numerous thermal cycles between 50° C. and −78.5° C., while maintaining good adhesion to a metal substrate. As a result, coating layers formed from the coating compositions of the present disclosure might be useful as a tank liner or as a pipe coating, among other uses.

As discussed herein, the coating composition of the present disclosure includes 40 to 80 weight percent (wt. %) of a base polymer; 10 to 30 wt. % of a polymeric stabilizing agent; 5 to 15 wt. % of a polymeric coupling agent; 0 to 35 wt. % of a polymeric performance improving agent; a neutralizing agent that partially or fully neutralize the polymeric stabilizing agent; and a fluid medium, where the wt. % values are based on the total weight of the base polymer, the polymeric coupling agent, the polymeric stabilizing agent and, when present, the polymeric performance improving agent (as used herein, this total weight of the base polymer, the polymeric coupling agent, the polymeric stabilizing agent and, when present, the polymeric performance improving agent, may be referred to as the "solid content" of the coating composition). The wt. % values provided herein are based on the total weight of the solid content of the coating composition and sum to a value of 100 wt. %.

As provided herein, advantages of the coating layer of the present disclosure are the combination of its acid and base resistance, flexibility and its adhesion to a variety of substrate surfaces (e.g., metal, epoxy, polyurethane, cement surfaces, among others). Other advantages are discussed herein.

Base Polymer

The coating composition includes from 40 to 80 wt. % of a base polymer, where the wt. % is based on the total weight of the solid content, as defined herein, of the coating composition. All individual values and sub-ranges from 40 to 80 wt. % are included herein and disclosed herein; for example, the wt. % can be from a lower limit of 40, 45 or 50 wt. % to an upper limit of 70, 75, or 80 wt. %. For example, the coating composition may comprise from 40 to 75 wt. %, or from 40 to 70 wt. %, or from 45 to 80 wt. %, or from 45 to 75 wt. %, or from 45 to 70 wt. %, or from 50 to 80 wt. %, or from 50 to 75 wt. %, or from 50 to 70 wt. % of the base polymer, based on the total weight of the solid content of the coating composition. The coating composition can include at least one or more of the base polymers. For example, the coating composition can include two or more base polymers, as discussed herein. So, as used herein "a base polymer" or "the base polymer" can be substituted with "two or more base polymers."

The base polymer can be selected from the group consisting of a non-functionalized ethylene polymer, a non-functionalized propylene polymer, a non-functionalized propylene/ethylene copolymer, and combinations thereof. For example, the base polymer may include two or more of the non-functionalized polymers discussed herein. As used herein, "non-functionalized" means the absence of a reactive polar group on the polymer.

The non-functionalized ethylene polymer can be selected from the group consisting of polyethylene, an ethylene-copolymer and a combination thereof. Examples of the ethylene-copolymer can include non-functionalized propylene/ethylene copolymers. The propylene/ethylene copoly-
mers may include propylene-ethylene alternating copolymers. Examples of such non-functionalized ethylene polymers and non-functionalized propylene/ethylene copolymers include, but are not limited to, VERSIFY™ DP-4000.01; VERSIFY™ 4200, VERSIFY™ 4000, VERSIFY™ 3200, VERSIFY™ 3000, and VERSIFY™ 3300, all available from The Dow Chemical Company; ENGAGE™ 8407 available from The Dow Chemical Company; INFUSE™ 9807 available from The Dow Chemical Company; Vistamaxx™ propylene-based elastomers (available from ExxonMobil Chemical); commercially available high density polyethylenes such as, but are not limited to, DMDA-8007 NT 7 (Melt Index 8.3, Density 0.965), DMDC-8910 NT 7 (Melt Index 10, Density 0.943), DMDA-1210 NT 7 (Melt Index 10, Density 0.952), HDPE 17450N (Melt Index 17, Density 0.950), DMDA-8920 NT 7 (Melt Index 20, Density 0.954), DMDA 8940 NT 7 (Melt Index 44, Density 0.951), DMDA-8950 NT 7 (Melt Index 50, Density 0.942), DMDA-8965-NT 7 (Melt Index 66, Density 0.952), DMDA-8940 HDPE (Melt Index of approximately 40-48 g/10 min), all available from The Dow Chemical Company.

Exemplary non-functionalized ethylene polymers can also include homogeneous polymers, as for example described in U.S. Pat. No. 3,645,992; high density polyethylene (HDPE), as for example described in U.S. Pat. No. 4,076,698; heterogeneously branched linear low density polyethylene (LLDPE); heterogeneously branched ultra-low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA). The non-functionalized ethylene polymer has a crystalline melting point of 100° C. to 230° C. Other values are possible, where the crystalline melting point is measured by calorimetry measurements.

Examples of the non-functionalized propylene polymer can include, but are not limited to, 6D43 Polypropylene (available from Braskem). Generally the non-functionalized propylene polymer can be characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}$C NMR spectra.

Other examples of the base polymer include, but are not limited to, ethylene ethyl acrylate copolymer, ethylene methyl methacrylate, ethylene butyl acrylate, and combinations thereof.

The base polymer can have a density of at least 0.88 grams/mole as measured by ASTM D972. Specific examples include, but are not limited to, 0.88 grams/mole to 1.0 grams/mole or from 0.88 grams/mole to 0.98 grams/mole. The base polymer has a crystalline melting point of at least 100° C. as measured using Differential Scanning calorimetry (DSC).

Polymeric Stabilizing Agent

The coating composition further includes a polymeric stabilizing agent to promote the formation of a stable dispersion during the formation of the coating composition. The polymeric stabilizing agent may preferably be an external stabilizing agent. The coating composition includes 10 to 30 wt. % of the polymeric stabilizing agent, based on the total weight of the solid content, as defined herein, of the coating composition. The coating composition can also include 5 to 50 wt. % of the polymeric stabilizing agent, based on the total weight of the solid content, as defined herein, of the coating composition. All individual values and subranges from 5 to 50 wt. % are included herein and disclosed herein; for example, the wt. % can be from a lower limit of 5, 10 or 15 wt. % to an upper limit of 30, 40 or 50 wt. %. For example, the coating composition may comprise from 5 to 40 wt. %, or from 5 to 30 wt. %, or from 10 to 30 wt. %, or from 10 to 40 wt. %, or from 10 to 50 wt. %, or from 15 to 30 wt. %, or from 15 to 40 wt. % or from 15 to 50 wt % of the polymeric stabilizing agent, based on the total weight of the solid content of the coating composition. The coating composition may also comprise from 20 to 24 wt. % of the polymeric stabilizing agent, based on the total weight of the solid content of the coating composition.

The polymeric stabilizing agent can have an acid number of equal to or greater than 100, greater than 110, or for a number of embodiments greater than 140. The polymeric stabilizing agent can be a polar polymer, e.g., including a polar group as either a comonomer or grafted monomer. In some embodiments, the polymeric stabilizing agent can include one or more polar polyolefins, e.g., having a polar group as either a comonomer or grafted monomer. Acid Number values (the amount of KOH in mg KOH/g polymer required to neutralize acid functionality when measured by titration) can be measured according to ASTM D-1386.

Examples of polymeric stabilizing agents include, but are not limited to, ethylene-acrylic acid and ethylene-methacrylic acid copolymers having a functionality in a range of 10 wt. % to 25 wt. %. Functionality values (the amount of functional monomer expressed as weight percent of the resin) can be determined by ASTM D 4094 or equivalent. Examples of such polymeric stabilizing agents include those available under the trademarks PRIMACOR™, such as PRIMACOR™ 5980i or PRIMACOR™ 5990i, both commercially available from The Dow Chemical Company; NUCREL™, commercially available from E.I. DuPont de Nemours; and ESCOR™, commercially available from ExxonMobil Chemical Company and described in U.S. Pat. Nos. 4,599,392, 4,988,781, and 5,938,437, each of which is incorporated herein by reference in its entirety. Other ethylene-carboxylic acid copolymer may also be used. Those having ordinary skill in the art will recognize that a number of other useful polymers may also be used. Examples include products under the trade name CERAMER from Baker-Hughes Company, such as CERAMER 1608; and PA-18 polyanhydride copolymer from Chevron-Phillips Company.

Polymeric Coupling Agent

The coating composition further includes a polymeric coupling agent. The polymeric coupling agent can help in formation of the coating composition, e.g., help provide a more uniform dispersion, and/or improve properties of a cured coating composition. The coating composition includes 5 to 15 wt. % of the polymeric coupling agent, based on the total weight of the solid content, as defined herein, of the coating composition. All individual values and subranges from 5 to 15 wt. % are included herein and disclosed herein; for example, the wt. % can be from a lower limit of 5 or 6 wt. % to an upper limit of 8, 9 or 15 wt. %. For example, the coating composition may comprise from 5 to 8 wt. %, or from 5 to 9 wt. %, or from 5 to 15 wt. %, or from 6 to 8 wt. %, or from 6 to 9 wt. %, or from 6 to 15 wt. % of the polymeric coupling agent, based on the total weight of the solid content of the coating composition.

The polymeric coupling agent can have a melt viscosity of less than 80000 centipoise (cP) at 150° C., less than 40000 cP at 150° C., less than 20000 cP at 150° C., or for a number of embodiments, less than 10000 at 150° C. Melt viscosity can be determined by DIN 53019 or ASTM D-1986, e.g., measurement of wax viscosity using a Brookfield rotational viscometer. For a number of embodiments, the polymeric coupling agent can have an acid number less than 100.

The polymeric coupling agent can include a modified, e.g., functionalized, polymer, such as a functionalized polyolefin. For example, the polymeric coupling agent can be selected from the group consisting of a functionalized polypropylene, a functionalized polyethylene homopolymer, a copolymer that has been modified with carboxylic acid groups, a copolymer that has been modified with anhydride groups and a combination thereof. The polymeric coupling agent can also be selected from a low molecular weight compound having reactive polar groups. Examples of the polymeric coupling agent include, but are not limited to modified olefin polymers. The modified olefin polymers can include graft copolymers and/or block copolymers, such as propylene-maleic anhydride graft copolymer. Examples of groups that can modify the polymer include, but are not limited to, acid anhydrides, carboxylic acids, carboxylic acid derivatives, primary and secondary amines, hydroxyl compounds, oxazoline and epoxides, and ionic compounds, and combinations thereof.

Specific examples of the groups that can modify the polymer include, but are not limited to, unsaturated cyclic anhydrides and their aliphatic diesters, and the diacid derivatives. For example, maleic anhydride and compounds selected from $C_1$-$C_{10}$ linear and branched dialkyl maleates, $C_1$-$C_{10}$ linear and branched dialkyl fumarates, itaconic anhydride, $C_1$-$C_{10}$ linear and branched itaconic acid dialkyl esters, maleic acid, fumaric acid, itaconic acid, and combinations thereof. Commercially available examples of polymeric coupling agents include, but are not limited to, polymers available under the trade name LICOCENE®, or LICOLUBE®, from Clariant Corporation, such as LICOCENE® 6452 (e.g., LICOCENE® PP MA 6452) and LICOCENE® 4351 (e.g., LICOCENE® PE MA 4351); polymers under the trade name A-C™ Performance Additives from Honeywell Corporation, such as AC575™ which is an ethylene maleic anhydride copolymer, and AC-392™ and AC395™ which are high density oxidized polyethylene; products under the trade name CERAMER from Baker-Hughes Company; EXXELOR™ from ExxonMobil Chemical Company; and Epolene from Westlake Chemical Company.

Polymeric Performance Improving Agent

The coating composition further includes a polymeric performance improving agent. The polymeric performance improving agent can help to simultaneously provide particular performance characteristics, such as particular appearance properties and particular mechanical and chemical resistance properties for a coated article, which are desirable for some coating applications. The coating composition includes 0 to 35 wt. % of the polymeric performance improving agent, based on the total weight of the solid content, as defined herein, of the coating composition. All individual values and subranges from 0 to 35 wt. % are included herein and disclosed herein; for example, the wt. % can be from a lower limit of 0, 5 or 10 wt. % to an upper limit of 15, 20, or 35 wt. %. For example, the coating composition may comprise from 0 to 15 wt. %, or from 0 to 20 wt. %, or from 0 to 35 wt. %, or from 5 to 15 wt. %, or from 5 to 20 wt. %, or from 5 to 35 wt. %, or from 10 to 15 wt %, or from 10 to 20 wt. % or from 10 to 35 wt. % of the polymeric performance improving agent, based on the total weight of the solid content of the coating composition.

The polymeric performance improving agent can have an acid number of less than 60, less than 50, or for a number of embodiments, less than 42. Acid number can be determined by ASTM D-1386, for example. Acid number can refer to an amount of KOH in mgKOH/g polymer required to neutralize acid functionality when measured by titration. Alternatively the percent functionality can be determined by Fourier Transform Infrared Spectrosdopy (FTIR).

The polymeric performance improving agent can have a melt index value of less than 100, less than 70, or for a number of embodiments, less than 30. Melt index values can be determined by ASTM D-1238, for example. As used herein, melt index values can be defined as the amount of polymer melt passing in dg/min (or g/10 min) through a heated syringe with a plunger load, e.g., at 190° C. and 2.16 kg load for polyethylene based polymer and at 230° C. and 2.16 kg for polypropylene based polymer.

Embodiments of the present disclosure provide that the polymeric performance improving agent can be selected from the group consisting of functionalized polyethylene, functionalized polypropylene, non-functionalized copolymer of ethylene and propylene and a combination thereof. Examples of the functionalized polyethylene include, but are not limited to, maleic anhydride functionalized polyethylene, such as high density polyethylene. Maleic anhydride functionalized polyethylene copolymers, terpolymers and blends may also be used. Maleic anhydride functionality can be incorporated into the polymer by grafting or other reaction methods. When grafting, the level of maleic anhydride incorporation is typically below 3 percent by weight based on the weight of the polymer. Examples of commercially available maleic anhydride functionalized polyethylene include those available under the tradename AMPLIFY™ available from The Dow Chemical Company, such as AMPLIFY™ GR-204, among others. Amplify GR-204 is 2,5-Furandione modified ethylene/hexene-1 polymer. Other examples of maleic anhydride functionalized polyethylene are available under the tradename FUSABOND™ available from E.I. du Pont de Nemours and Company such as FUSABOND™ E-100, FUSABOND™ E-158, FUSABOND™ E265, FUSABOND™ E528, FUSABOND™ E-589, FUSABOND™ M-603, among others; Other maleic anhydride grafted polyethylene polymers, copolymers, and terpolymers may include POLYBOND™ available from Chemtura, such as POLYBOND™ 3009 and POLYBOND™ 3029, among others; OREVAC™ available from ARKEMA, such as OREVAC™ 18510P, among others; PLEXAR™ from Lyondell Chemical Company, such as PLEXAR™ PX-2049; also grades available under the tradename YPAREX from B.V. DSM Engineering Plastics, such as YPAREX 8305; and polymers available under the tradename EXXELOR™, such as Exxelor™ PE 1040. Other examples include LOTADER 4210 a random terpolymer of ethylene, acrylic ester and maleic anhydride available from ARKEMA. Additional polyethylene functionalized with glycidyl methacrylate may be used. Other examples of the polymeric performance improving agent include non-functionalized polymers available under the trade name VERSIFY™, such as VERSIFY™ 4200, VERSIFY™ 4000, VERSIFY™ 3200, VERSIFY™ 3000, and VERSIFY™ 3300, all available from The Dow Chemical Company.

Neutralizing Agent

The acid groups of the polymeric stabilizing agent may be partially or fully neutralized with a neutralizing agent. In certain embodiments, neutralization of the stabilizing agent may be from 25 to 200 percent on a molar basis; or in the alternative, it may be from 50 to 165 percent on a molar basis; or in the alternative, it may be from 50 to 150 percent on a molar basis; or in the alternative, it may be from 50 to 120 percent on a molar basis.

Examples of suitable neutralizing agents include a volatile base. As used herein a volatile base is a base that can be evaporated (conversion of a liquid to a gas or vapor) at a temperature in a range from 100° C. to 200° C. at a pressure in a range of 1 atmosphere. Examples of such a volatile base include, but are not limited to, N,N-dimethylethanolamine, ammonia, hydrazine, methylamine, ethylamine, diethylamine, triethylamine, isobutylamine, N,N-diisopropylethylamine, morpholine, piperazine, ethylenediamine, and 1,4-diazabicyclo[2.2.2]octane). Evaporation of the volatile base upon formation of the coating layer results in the functional groups of the polymeric stabilizing agent reverting to the acid form where it can help to promote adhesion of the coating layer to the surface of the substrate.

Other neutralizing agents can include, for example, an amine such as monoethanolamine, or 2-amino-2-methyl-1-propanol (AMP). Amines useful in embodiments disclosed herein may include diethanolamine, triethanolamine, and TRIS AMINO™ (each available from Angus), NEUTROL™ TE (available from BASF), as well as triisopropanolamine and diisopropanolamine (each available from The Dow Chemical Company). Other useful amines may include dimethylamine, trimethylamine, mono-n-propylamine, butylamine, dibutylamine, tributylamine, dimethyl benzyl amine, dimethyl n-propylamine, N-methanol amine, N-aminoethylethanolamine, N-methyldiethanolamine, monoisopropanolamine, N,N-dimethyl propanolamine, 2-amino-2-methyl-1-propanol, 1,2-diaminopropane, tris(hydroxymethyl)-aminomethane, ethylenediamine, N,N,N'N'-tetrakis(2-hydroxylpropyl)ethylenediamine, 3-methoxypropyl amine, imino bis-propyl amine, and the like. In some embodiments, mixtures of amines or mixtures of amines and surfactants may be used. In one embodiment, the neutralizing agent may be a polymeric amine, e.g. diethylene triamine. Those having ordinary skill in the art will appreciate that the selection of an appropriate neutralizing agent depends on the specific composition formulated, and that such a choice is within the knowledge of those of ordinary skill in the art. In one embodiment, amines with boiling points below 250° C. may be used as the neutralizing agents.

Fluid Medium

The coating composition further includes a fluid medium. The fluid medium may be, for example, water; or in the alternative, the fluid medium may be a mixture of water and one or more organic solvents, e.g. one or more water miscible solvents or one or more water immiscible solvents, or combinations thereof. The coating composition of the present disclosure includes 15 to 99 percent by weight of fluid medium, based on the total weight of the coating composition. In particular embodiments, the fluid medium content may be in the range of from 30 to 80, or in the alternative from 35 to 75, or in the alternative from 40 to 70 percent by volume, based on the total weight of the coating composition.

Fluid medium content of the coating composition may preferably be controlled so that the solids content (base polymer(s), polymeric stabilizing agent(s), polymeric coupling agent and optionally polymeric performance improving agent(s)) is from 15 percent to 99 percent by weight of the coating composition. In particular embodiments, the solids range may be from 15 percent to 85 percent by weight of the coating composition. In other particular embodiments, the solids range may be from 30 percent to 80 percent by weight of the coating composition. In other particular embodiments, the solids range is from 35 percent to 75 percent by weight of the coating composition. In certain other embodiments, the solids range is from 40 percent to 70 percent by weight of the coating composition.

The coating composition of the present disclosure may optionally be blended with one or more cross-linkers such as those described in PCT Pub. No. WO/2011/011707. These cross-linkers may be organic, or inorganic (i.e. zinc nanoparticles) in nature. The coating composition of the present disclosure may also be optionally be blended with one or more binder compositions such as acrylic latex, vinyl acrylic latex, styrene acrylic latex, vinyl acetate ethylene latex, and combinations thereof; optionally one or more fillers; optionally one or more additives such as catalysts, wetting agents, defoamers, flow agents, release agents, slip agents, anti-blocking agents, additives to mask sulfur staining, pigment wetting/dispersion agents, anti-settling agents, UV stabilizers, adhesion promoters; optionally one or more lubricants such as fatty acid ester wax, silicon-based wax, fluorine-based wax, polyethylene or any other similar polyolefin wax, carnauba wax, lanolin wax or the like; optionally one or more corrosion inhibitors such as aluminum, and zinc: optionally one or more pigments, e.g. titanium dioxide, barium sulfate, mica, calcium carbonate, silica, zinc oxide, milled glass, aluminum trihydrate, talc, antimony trioxide, fly ash, and clay or the like; optionally one or more co-solvents, e.g. glycols, glycol ether, 2,2,4-trimethyl-1,3-pentanediol monoisobutyrate, alcohols, mineral spirits, aromatic solvents and benzoate esters or the like; optionally one or more dispersants, e.g. aminoalcohols, and polycarboxylates; optionally one or more surfactants; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or optionally one or more additional neutralizing agents, e.g. hydroxides, amines, ammonia, and carbonates; optionally one or more solvents or coalescing agents.

In addition, the coating composition may be blended with one or more dispersions, emulsions, suspensions, colloidal suspensions, and the like.

The coating composition can be formed by any number of methods recognized by those having skill in the art. Dispersion equipment can be operated in batch, semi-batch, or continuous mode. Examples of mixers used in the dispersion include rotor-stator, microfluidizer, high pressure homogenizer, ultrasonic, impinging jet, Cowles blade, planetary mixers, and melt kneading devices such as extruders.

In one embodiment, the base polymer and the polymeric stabilizing agent are melt-kneaded in an extruder along with the fluid medium (e.g., water) and optionally the neutralizing agent to form a dispersion. In another embodiment, the base polymer and the polymeric stabilizing agent are compounded, and then melt-kneaded in an extruder in the presence of the fluid medium (e.g., water), and optionally the neutralizing agent, thereby forming a dispersion. In some embodiments, the dispersion is first diluted to contain 1 to 20%, e.g., 1 to 5% or 1 to 3%, by weight of the fluid medium and then, subsequently, further diluted to comprise greater than 25% by weight of the fluid medium. In one embodiment, further dilution may be accomplished via water and/or a solvent as provided herein.

Melt-kneading means known in the art may be used. In some embodiments, a kneader, a BANBURY® mixer, single-screw extruder, or a multi-screw extruder, e.g. a twin screw extruder, is used. One example of a suitable extruder system is provided in PCT publication WO 2011/068525 entitled "Extruder Screw," which is incorporated herein by reference.

A process for producing the coating composition in accordance with the present disclosure is not particularly limited. For example, an extruder, in certain embodiments, for example, a twin screw extruder, is coupled to a back pressure regulator, melt pump, or gear pump. Exemplary embodiments also provide a neutralizing agent reservoir and an initial fluid medium reservoir, each of which includes a pump. Desired amounts of neutralizing agent and initial fluid medium are provided from the neutralizing agent reservoir and the initial fluid medium reservoir, respectively. Any suitable pump may be used, but in some embodiments, for example, a pump that provides a flow of about 150 cubic centimeters per minute (cc/min) at a pressure of 240 bar is used to provide the neutralizing agent and the initial fluid medium to the extruder. In other embodiments, a liquid injection pump provides a flow of 300 cc/min at 200 bar or 600 cc/min at 133 bar. In some embodiments, the neutralizing agent and initial fluid medium are preheated in a preheater.

The base polymer, in the form of pellets, powder, or flakes, is fed from the feeder to an inlet of the extruder where the base polymer is melted or compounded. The polymeric stabilizing agent, polymeric coupling agent, and the polymeric performance improving agent can also be fed simultaneously with the base polymer into the extruder via the feeder; or in the alternative, the polymeric stabilizing agent can be compounded into the base polymer, and then fed into the extruder via the feeder. In the alternative, the polymeric stabilizing agent can be metered via an inlet prior to the emulsification zone into the molten compound including the base polymer. In some embodiments, the polymeric stabilizing agent is added with the base polymer and in other embodiments, the polymeric stabilizing agent is provided separately to the twin screw extruder. The polymer melt is then delivered from the mix and convey zone to an emulsification zone of the extruder where the initial amount of fluid medium and neutralizing agent from the fluid medium and neutralizing agent reservoirs are added through an inlet. In some embodiments, the polymeric coupling agent and the polymeric performance improving agent can be added additionally or exclusively to the fluid medium stream.

In some embodiments, further fluid medium may be added via fluid medium inlet from fluid medium reservoir in a dilution and cooling zone of the extruder. Typically, the dispersion is diluted to at least 30 weight percent fluid medium in the cooling zone. In addition, the diluted mixture may be diluted any number of times until the desired dilution level is achieved. In some embodiments, the dispersion is further cooled after exiting the extruder by the use of a suitable heat exchanger. In other embodiments, fluid medium is not added into the twin screw extruder but rather to a stream containing the melt after the melt has exited from the extruder. In this manner, vapor pressure (e.g., steam pressure) build-up in the extruder is eliminated and the dispersion is formed in a secondary mixing device such as a rotor stator mixer.

In another embodiment, the coating composition can be formed in a continuous high shear mixer without the use of a melt kneading extruder. In this embodiment, the first stream including one or more liquid or molten base polymers is supplied to a continuous high shear mixer from a suitable liquid pump for example, a syringe pump, gear pump, or progressive cavity pump. The first stream is flowed through a first conduit and merged continuously with a second stream containing fluid medium that is flowed through a second conduit. The first and second streams are merged into a disperser in the presence polymeric stabilizing agent, polymeric coupling agent and the polymeric performance improving agent with the neutralizing agent. The agents can be added to either the first or second stream, or as a separate stream. A third stream including the fluid medium (e.g., water) can be added downstream from the disperser. The flow rates of the streams are adjusted to achieve a dispersion having the desired amount of polymer phase and percent solids. The disperser can be any one of a number of continuous inline mixers, for example, an IKA high-shear mixer, Oakes rotor stator mixer, Ross mixer, Silverson mixer, or centrifugal pump. The rotations-per-minute (rpm) setting of the disperser can be used to help control the particle size of the dispersed hydrophobic phase in the dispersion. The system can be heated to provide the polymer and neutralizer components at a suitable viscosity for pumping. Steam formation is reduced by controlling the pressure through the use of a backpressure regulator, gear pump, metering pump, or other suitable device near the exit of the process. In some embodiments, the dispersion is further cooled after exiting the disperser by the use of a suitable heat exchanger.

In another embodiment, the coating composition can be formed in a batch or semi-batch process using a high shear mixer where the mixer may, for example, be disposed within a pressurized tank to, for example, reduce steam formation. All or at least a portion of the dispersion is removed from the tank during processing, and optionally cooled by the use of a suitable heat exchanger.

During the preparation of the coating composition, optionally one or more fillers; optionally one or more additives such as catalysts, cross-linkers, wetting agents, defoamers, flow agents, release agents, slip agents, anti-blocking agents, additives to mask sulfur staining, pigment wetting/dispersion agents, anti-settling agents, UV stabilizers, adhesion promoters; optionally one or more lubricants such as fatty acid ester wax, silicon-based wax, fluorine-based wax, polyethylene or any other similar polyolefin wax, carnauba wax, lanolin wax or the like; optionally one or more corrosion inhibitors such as aluminum, and zinc: optionally one or more pigments, e.g. titanium dioxide, mica, calcium carbonate, barium sulfate, silica, zinc oxide, milled glass, aluminum trihydrate, talc, antimony trioxide, fly ash, and clay or the like; optionally one or more dyes; optionally one or more co-solvents, e.g. glycols, glycol ether, 2,2,4-trimethyl-1,3-pentanediol monoisobutyrate, alcohols, mineral spirits, and benzoate esters or the like; optionally one or more dispersants, e.g. aminoalcohols, and polycarboxylates; optionally one or more surfactants; optionally one or more defoamers; optionally one or more preservatives, e.g. biocides, mildewcides, fungicides, algae-cides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or optionally one or more additional neutralizing agents, e.g. hydroxides, amines, ammonia, and carbonates may be added to the coating composition formulation; or in the alternative, may be added to the dispersion post dispersion formulation process.

During the preparation of the coating composition, the polymeric stabilizing agent may also be added to the dispersion post dispersion formulation process.

Optionally during the dispersion of the base polymer another polymer dispersion or emulsion may be used as a portion of the aqueous phase of the dispersion. Examples include, but are not limited to, acrylic, epoxy, polyester, polyurethane, polyolefin, polyamide and the like containing dispersions, emulsions, suspensions, colloidal suspensions.

The coating composition may be used, for example, in a metal coating, a pipe coating, a coil coating, a tank liner coating, over non-ferrous substrates (i.e., epoxy, polyurethane), or direct to a metal substrate, among others. One advantage of the coating layer of the present disclosure is the combination of its acid and base resistance, flexibility and its adhesion to a variety of substrate surfaces (e.g., metal, epoxy, polyurethane, cement substrates).

Examples of such a substrate surface include, but are not limited to, a metal substrate. The metal substrate includes one or more metals including, but not limited to, aluminum and aluminum alloys, electrolytic tinplate cold rolled low carbon mild steel ("ETP"), electrolytic chromium/chromium oxide coated cold rolled low carbon mild steel (ECCS), and any other pre-treated steel. Pretreatment may include, but is not limited to, treatment with phosphoric acid, zirconium phosphate, chromium phosphate, and the like as well as silanes for reasons such as primary corrosion protection and improved adhesion. The metal substrate may comprise a sheet, strip or a coil.

The metal substrate may be pre-coated with one or more pre-coating compositions. Such pre-coating compositions may optionally further include, but are not limited to, one or more resin binders, one or more resin crosslinkers, one or more solvents, one or more additives, and one or more pigments. Exemplary resin binders include, but are not limited to, epoxy, polyester, polyurethane, polyvinyl chloride containing organosols/vinyls, phenolic, alkyd, oleoresin, acrylic resin, and the like. Exemplary crosslinkers include, but are not limited to, phenol-formaldehyde resins; amino-formaldehyde resins including but not limited to urea-formaldehyde, melamine formaldehyde, benzoguanamine formaldehyde, anhydride resins, blocked isocyanate resins and epoxy groups containing resins, including but not limited to, epoxy resins, epoxy groups containing polyesters, acrylic resins, vinyl resins or the like.

Exemplary solvents and thinners include, but are not limited to, glycol ethers, alcohols, aromatics, e.g. aromatic hydrocarbons, white spirit, branched ketones and esters. Exemplary additives include, but are not limited to, catalysts, lubricants, wetting agents, defoamers, flow agents, release agents, slip agents, anti-blocking agents, additives to mask sulfur staining, pigment wetting/dispersion agents, anti-settling agents, UV stabilizers, adhesion promoters. Pigments include, but are not limited to titanium dioxide, zinc oxide, aluminum oxide, zinc and aluminum.

The substrate may also be pre-coated with one or more pre-coated laminate compositions. Such compositions may, for example, include polyethylene, epoxy, polyurethane, polypropylene, or polyester compositions, and may be applied either as a film via film lamination process or melt-extrusion coating process onto the metal surface.

In addition to metal substrates, the coating composition of the present disclosure can also be used on polymer surfaces (e.g., polyurethane, cured epoxy), cement surfaces, cellulose based surfaces, mineral based surfaces and/or ceramic surfaces and combinations thereof, among others.

The individual coating layer may be applied via a variety of methods; for example, via roller coating, spray coating, powder coating, dip coating, electrodeposition coating, printing, wash coating, flow coating, curtain coating. The thicknesses of the resulting coating layer can range from 0.01 micrometer ($\mu m$) to 250 $\mu m$. All individual values and sub-ranges from 0.01 $\mu m$ to 250 $\mu m$ are included herein and disclosed herein; for example, the thickness of the coating layer can be from a lower limit of 0.01 $\mu m$, 0.02 $\mu m$ or 0.03 $\mu m$ to an upper limit of 150 $\mu m$, 200 $\mu m$ or 250 $\mu m$. For example, the coating composition may comprise from 0.01 $\mu m$ to 150 $\mu m$, or from 0.01 $\mu m$ to 200 $\mu m$, or from 0.01 $\mu m$ to 250 $\mu m$, or from 0.02 $\mu m$ to 150 $\mu m$, or from 0.02 $\mu m$ to 200 $\mu m$, or from 0.02 $\mu m$ to 250 $\mu m$, or from 0.03 $\mu m$ to 150 $\mu m$, or from 0.03 $\mu m$ to 200 $\mu m$ or from 0.03 $\mu m$ to 250 $\mu m$. One or more coating layers may be applied to a substrate.

The coating composition applied to the at least one surface of the metal substrate may be dried via a conventional drying method to form the coating layer. Such a conventional drying method includes but, is not limited to, air drying, convection oven drying, hot air drying, and/or infrared oven drying. The coating composition applied to the at least one surface of the metal substrate may be dried, for example, at a temperature in the range of equal or greater than the melting point temperature of the base polymer; or in the alternative, it may be dried at a temperature in the range of less than the melting point of the base polymer.

The coating composition applied to the at least one surface of the metal substrate may be dried at a temperature in the range of 100° C. to 230° C. for less than about 40 minutes, for example, less than 20 minutes, or less than 10 minutes, or less than 5 minutes, or less than 2 minutes, or less than 1 minute or less than 20 seconds. All individual values and subranges from 100° C. to 230° C. are included herein and disclosed herein; for example, the coating composition applied to the at least one surface of the metal substrate may be dried at a temperature in the range of 120° C. to 210° C. for less than about 40 minutes, for example, less than 20 minutes, or less than 10 minutes, or less than 5 minutes, or less than 2 minutes, or less than 1 minute, or in the alternative, the coating composition applied to the at least one surface of the metal substrate may be dried at a temperature in the range of 140° C. to 200° C. for a period of less than about 40 minutes, for example, less than 20 minutes, or less than 10 minutes, or less than 5 minutes, or less than 2 minutes, or less than 1 minute.

The temperature of the coating composition applied to the at least one surface of the metal substrate may be raised to a temperature in the range of equal or greater than the melting point temperature of the base polymer for a period of less than about 40 minutes. All individual values and subranges from less than about 40 minutes are included herein and disclosed herein; for example, the temperature of the coating composition applied to the at least one surface of the metal substrate may be raised to a temperature in the range of equal or greater than the melting point temperature of the base polymer for a period of less than about 20 minutes, or in the alternative, the temperature of the coating composition applied to the at least one surface of the metal substrate may be raised to a temperature in the range of equal or greater than the melting point temperature of the base polymer for a period of less than about 5 minutes, or in another alternative, the temperature of the coating composition applied to the at least one surface of the metal substrate may be raised to a temperature in the range of equal or greater than the melting point temperature of the base polymer for a period in the range of about 0.5 to 300 seconds. In another alternative, the temperature of the coating composition applied to the at least one surface of the metal substrate may be raised to a temperature in the range of less than the melting point temperature of the base polymer for a period of less than 40 minutes. All individual values and subranges from less than about 40 minutes are included herein and disclosed herein; for example, the temperature of the coating composition applied to the at least one surface of the metal substrate may be raised to a temperature in the range of less than the melting point temperature of the base polymer for a period of less than about 20 minutes, or in the alternative, the temperature of the coating composition applied to the at least one surface of the metal substrate may be raised to a temperature in the range of less than the melting point temperature of the base polymer for a period of less than about 5 minutes, or in another alternative, the temperature of the coating composition applied to the at least one surface of the metal substrate may be raised to a temperature in the range of less than the melting point temperature of the base polymer for a period in the range of about 0.5 to 300 seconds.

EXAMPLES

The following examples illustrate the present disclosure but are not intended to limit the scope of the disclosure. The examples of the instant disclosure demonstrate that the coating composition applied to at least one surface of a metal substrate provide for improved coating layer flexibility as well as coating layer adhesion to the metal substrate.

Preparation and Curing of Coatings Layers

Prepare coating layers on uncoated cold rolled steel or iron phosphated steel substrates (Q-Lab Corporation and ACT Test Panel Technologies) using a drawdown bar with a 10 mil gap (equal to 0.0254 millimeters (mm)). Cure all coatings compositions at 140° C. for 10 minutes, except for Inventive Example 5 and Example 6 and Comparative Example A, which were cured at 200° C. for 10 minutes, and Comparative Examples G and H which cure for 7 days at room temperature (23° C.). Thicknesses of the coating layers ranged from 1.9-5.8 mil.

Prepare coating layers from the coating compositions of Examples 1-5 on polyurethane, thermoplastic olefin (TPO), epoxy, and fiber/cement substrates to test adhesion. Cast films of the coating composition using a 10 mil gap bar. Prepare polyurethane substrates by applying a wet film of POLANE™B polyurethane enamel blended with V66V27 catalyst, available from Sherwin Williams, using a 10 mil gap bar on cold rolled steel panels and cure the panels overnight at room temperature (23° C.) followed by force curing at 80° C. for 40 minutes.

Epoxy substrates were e-coated panels available from ACT Test Panel Technologies. TPO substrates are available from Custom Precision R&D Testing Panels, Inc. 30 cm×60 cm×3-4 mm fiber/cement panels consisting of water/cement/cellulose/textile fibers/amorphous silica/calcium carbonate substrates are available from the Etex Group.

Thickness Measurement

Thickness of the coating layer was measured by according to ASTM-D 1186-93, a non-destructive measurement of dry film thickness of non-magnetic coatings applied to a ferrous base, using a Positector™ 6000 coating thickness gauge. The standard panel without any coating was used for calibration. The thickness of the coating layer on the coated panels was the average of a minimum of 4 measurements. The measured thickness was reported in mils (25 microns/mil).

Adhesion

Test cross-hatch adhesion according to ASTM-D 3359-08. Make a square lattice pattern with 10 cuts in each direction with 1 mm distance between neighboring cuts. Apply a pressure sensitive tape over the cut area and pull the tape parallel to the substrate surface. Evaluate the adhesion using a scale from 0B to 5B, with 5B indicating perfect adhesion to the substrate and 0B indicating that there was complete removal of the coating from the substrate.

| | |
|---|---|
| 5B | The edges of the cuts are completely smooth; none of the squares of the lattice is detached. |
| 4B | Small flakes of the coating are detached at intersections; less than 5% of the area is affected. |
| 3B | Small flakes of the coating are detached along the edges and at intersections of cuts. The area affected is 5-15% of the lattice. |
| 2B | The coating has flaked along the edges and on parts of the squares. The area affected is 15-35% of the lattice. |
| 1B | The coating has flaked along the edges of cuts in large ribbons and whole squares have detached. The area affected is 35-65% of the lattice. |
| 0B | Flaking and detachment is worse than 1B |

Particle Size Measurement

Measure particle size using a Coulter LS-230 or Coulter LS-13-320 particle size analyzer (Beckman Coulter Corporation).

Measurement Percent Solids

Measure percent solid using a microwave solids analyzer or an infrared solids analyzer.

Acid/Base Resistance

Test the coating layer resistance to 98% (mass fraction) sulfuric acid, 37% (kg HCl/kg) hydrochloric acid, glacial acetic acid (12 Normality) and 50% (kg NaOH/kg) sodium hydroxide. Place drops of each of the acids, or base, on the coating surface and place a plastic cap over the acid/base to inhibit evaporation. Add acid or base, as needed, to maintain exposure of the coating. Keep the samples at room temperature (23° C.) for 7 days and then completely rinse with water. After the samples dry, test adhesion and rate from 1 to 5, with 5 indicating an intact coating and 1 indicating a completely etched coating based on adhesion of the coating after exposure.

Freeze/Thaw Durability

Measure the tolerance of the coatings to temperature fluctuation by measuring their adhesion to the substrates after cycles of heating and cooling treatment. One cycle is heating in oven at 50° C. for 30 min followed by immersion in dry ice (solid carbon dioxide, −78.5° C. at atmospheric pressure) for 30 minutes. Measure adhesion according to the crosshatch adhesion procedure, as described herein, after 5 and 10 cycles of freeze/thaw treatment.

Solvent Resistance (MEK Double Rub)

Test solvent resistance according to ASTM D4752 using Methyl Ethyl Ketone (MEK). Test samples using a piece of cotton cheesecloth attached with copper wire to a 1.5 pound hammer. Saturate the cheesecloth with MEK and place on the coating. Push the hammer forward and then back at a rate of approximately 1 second per cycle. Visually inspect the coating layer after every 20 double rub cycle for any signs of damage or delaminating. Repeat this procedure until a bare panel is showing (record this as the MEK DR result for the sample) or after reaching 200 double rubs in total. Alternatively, an automated tester, available from DJH Designs may be used. The automated tester works in a semi-automatic fashion by moving a cotton pad, attached to a weighted block that applies about 2.2 lb/in$^2$, in a back and forth motion across the coated panel. Each back and forth is referred to as one double rub.

Impact Resistance

Measure impact resistance of the coating layer using a Gardner falling weight impact tester according to ASTM D-2794. Measure indentation in both direct and indirect modes. Units of measure are inch-lbs.

Mandrel Wedge Bend

Test mandrel wedge bend flexibility of the coating layer using a conical mandrel following ASTM D522-93a. Measurements are in millimeters from the small end of the mandrel to where cracking has ceased.

EXAMPLES

Example 1

Prepare Example 1 according to the following procedures based on the formulation components listed in Table I. For the base polymer use VERSIFY™ DP-4000.01 (The Dow Chemical Company, CAS No. 9010-79-1), which is a propylene/ethylene copolymer having a melt index of approximately 21-29 g/10 min (ASTM D1238, 230° C./2.16 Kg); for a polymeric coupling agent use LICOCENE™ 6452 (CLARIANT, CAS 25722-45-6), which is a propylene-maleic anhydride graft copolymer with an acid value of about 41; and for a polymeric stabilizing agent use PRIMACOR™ 5980i (The Dow Chemical Company, CAS No. 9010-77-9), which is an ethylene acrylic-acid copolymer having an acrylic acid content in the range of 19.5-21.5 weight percent and a melt index of approximately 300 g/10 min (ASTM D1238, 190° C./2.16 Kg).

Feed the base polymer, the polymeric coupling agent and the polymeric stabilizing agent into a 25 mm twin screw extruder (extruder speed approximately 500 rotations-per-minute (rpm)) by means of controlled rate feeders to be forwarded and melted. Ramp the extruder temperature profile to approximately 150° C., prior to the introduction of initial water and N,N-dimethylethanolamine (DMEA, 100%) (the neutralizing agent, CAS Number 108-01-0). Mix the DMEA and the water together and fed to the extruder at the initial water introduction point. Feed the dilution water via a second pump into the dilution zone of the extruder. The initial water and dilution water were optionally pre-heated to approximately 140° C. Use a back-pressure regulator at the extruder outlet to adjust to a suitable pressure inside the extruder barrel to reduce steam formation at the operating temperature. Cool the resulting coating composition and filter through a 200 micron filter.

Example 2

Prepare Example 2 according to the following procedures based on the formulation components listed in Table I. For a first base polymer use DMDA-8940 HDPE (The Dow Chemical Company, CAS No. 9002-88-4), which is a high density polyethylene polymer having a melt index of approximately 40-48 g/10 min (ASTM 1238, 190° C./2.16 kg); for a polymeric performance improving agent use AMPLIFY GR-204, which is an ethylene-maleic anhydride graft copolymer with a melt index of approximately 9-15 g/10 min (ASTM 1238, 190° C./2.16 kg) and a maleic anhydride level of approximately 1-1.4 weight percent; for a polymeric coupling agent use LICOCENE™ 4351 (CLARIANT); and for a polymeric stabilizing agent use PRIMACOR™ 5980i (The Dow Chemical Company, CAS No. 9010-77-9).

Feed each of the base polymer, the polymeric performance improving agent, the polymeric coupling agent and the polymeric stabilizing agent into a 25 mm twin screw extruder by means of controlled rate feeders to be forwarded and melted. The remainder of the process is as described for Example 1.

Example 3

Example 3 was prepared according to the following procedures based on the formulation components listed in Table I. For a first base polymer use DMDA-8940 HDPE (The Dow Chemical Company, CAS No. 9002-88-4); for a polymeric performance improving agent use AMPLIFY GR-204; as a polymeric coupling agent LICOCENE™ 4351 (CLARIANT, CAS No. 9006-26-2); and as a polymeric stabilizing agent use PRIMACOR™ 5980i (The Dow Chemical Company, CAS No. 9010-77-9).

Feed each of the base polymer, the polymeric performance improving agent, the polymeric coupling agent and the polymeric stabilizing agent into a 25 mm twin screw extruder by means of controlled rate feeders to be forwarded and melted. The remainder of the process is as described for Example 1.

Example 4

Example 4 was prepared according to the following procedures based on the formulation components listed in Table I. For a base polymer use DMDA-8940 HDPE (The Dow Chemical Company, CAS No. 9002-88-4); for a polymeric coupling agent use AC575-P, which is an ethylene maleic anhydride Copolymer (HONEYWELL INTERNATIONAL. INC., CAS No. 9006-26-2) having an acid value of approximately 35; and for a polymeric stabilizing agent use PRIMACOR™ 5980i (The Dow Chemical Company, CAS No. 9010-77-9).

Feed each of the base polymer, the polymeric coupling agent and the polymeric stabilizing agent into a 25 mm twin screw extruder by means of controlled rate feeders to be forwarded and melted. The remainder of the process is as described for Example 1.

Example 5

Example 5 was prepared according to the following procedures based on the formulation components listed in Table I. For a base polymer use 6D43 Polypropylene (Braskem, CAS No. 9002-88-4), which is a polypropylene polymer having a melt index of approximately 35 g/10 min (ASTM 1238, 230° C./2.16 kg); for a polymeric coupling agent use LICOCENE™ 6452 (CLARIANT, CAS 25722-45-6); and for a polymeric stabilizing agent use PRIMACOR™ 5980i (The Dow Chemical Company, CAS No. 9010-77-9).

Feed each of the base polymer, the polymeric coupling agent and the polymeric stabilizing agent into a 25 mm twin screw extruder by means of controlled rate feeders to be forwarded and melted. The remainder of the process is as described for Example 1, except ramp the extruder temperature profile to approximately 170° C., prior to the introduction of initial water and DMEA (100%) (CAS Number 108-01-0) as the neutralizing agent.

Example 6

Example 6 was prepared according to the following procedures based on the formulation components listed in Table I. For the base polymer use 6D43 Polypropylene (Braskem, CAS No. 9002-88-4); for the polymeric performance improving agent use VERSIFY™4200, available from the Dow Chemical Company (CAS No. 9010-79-1); for the polymeric coupling agent use LICOCENE™ 6452 (CAS 25722-45-6); and as the polymeric stabilizing agent use PRIMACOR™ 5980i (CAS No. 9010-77-9).

Feed each of the base polymer, the polymeric performance improving agent, the polymeric coupling agent and the polymeric stabilizing agent into a 25 mm twin screw extruder (speed approximately 1200 rpm) by means of controlled rate feeders to be forwarded and melted. The initial water and dilution water were optionally pre-heated to approximately 150° C. The remainder of the process is as described for Example 1.

Comparative Example A

Comparative Example A was prepared according to the following procedures based on the formulation components listed in Table I. For the base polymer use 6D43 Polypropylene (Braskem, CAS No. 9002-88-4), which is a polypropylene polymer having a melt index of approximately 35 g/10 min (ASTM 1238, 230° C./2.16 kg); for the polymeric stabilizing agent use PRIMACOR™ 5980i (The Dow Chemical Company, CAS No. 9010-77-9).

Feed each of the base polymer and the polymeric stabilizing agent into a 25 mm twin screw extruder (extruder speed approximately 500 rpms) by means of controlled rate feeders to be forwarded and melted. Ramp the extruder temperature profile to approximately 150° C., prior to the introduction of initial water and DMEA (100%) (CAS Number 108-01-0) as the neutralizing agent at the initial water introduction point. Feed dilution water via a second pump into the dilution zone of the extruder. The initial water and dilution water were optionally pre-heated to approximately 150° C. Use a back-pressure regulator at the extruder outlet to adjust the pressure inside the extruder barrel to reduce steam formation at the operating temperature. Cool the content of the 25 mm twin screw extruder to a temperature below 100° C. by the end of the extruder after adding the dilution water.

Comparative Example B

Prepare Comparative Example B according to the following procedures based on the formulation components listed in Table I. For the base polymer use ENGAGE™ 8407 (The Dow Chemical Company, CAS No. 26221-73-8), which is an ethylene-octene copolymer having a melt index of approximately 22-38 g/10 min (ASTM 1238, 190° C./2.16 kg); for the polymeric stabilizing agent use PRIMACOR™ 5980i (The Dow Chemical Company, CAS No. 9010-77-9).

Feed each of the base polymer and the polymeric stabilizing agent into a 25 mm twin screw extruder (extruder speed approximately 500 rpms) by means of controlled rate feeders to be forwarded and melted. Ramp the extruder temperature profile to approximately 130° C., prior to the introduction of initial water and DMEA (100%) (CAS Number 108-01-0) as the neutralizing agent at the initial water introduction point. Cool the content of the 25 mm twin screw extruder to a temperature below 100° C. by the end of the extruder after adding the dilution water.

Mix the DMEA and the water together and fed to the extruder at the initial water introduction point. Feed the dilution water via a second pump into the dilution zone of the extruder. The initial water and dilution water were not pre-heated. Use a back-pressure regulator at the extruder outlet to adjust to a suitable pressure inside the extruder barrel to reduce steam formation at the operating temperature. Cool the resulting dispersions and filter through a 200 micron filter.

Comparative Example C

Comparative Example C was prepared according to the following procedures based on the formulation components listed in Table I. For the base polymer use VERSIFY™ 3200 (The Dow Chemical Company, CAS No. 9010-79-1, which is a propylene/ethylene co-polymer having a melt index of approximately 6-10 g/10 min (ASTM 1238, 230° C./2.16 kg); for a polymeric coupling agent use LICOCENE™ 6452 (CLARIANT, CAS 25722-45-6) and for a polymeric stabilizing agent use PRIMACOR™ 5980i (The Dow Chemical Company, CAS No. 9010-77-9).

Feed each of the base polymer, the polymeric coupling agent and the polymeric stabilizing agent into a 25 mm twin screw extruder (extruder speed approximately 470 rpms) by means of controlled rate feeders to be forwarded and melted. Ramp the extruder temperature profile to approximately 150° C., prior to the introduction of initial water and DMEA (100%) (CAS Number 108-01-0) as the neutralizing agent at the initial water introduction point. Feed dilution water via a second pump into the dilution zone of the extruder. The initial water and dilution water were optionally pre-heated to approximately 140° C. After adding dilution water, cool the mixture to a temperature below 100° C. by the end of the extruder. At the extruder outlet, a back-pressure regulator was used to adjust to a suitable pressure inside the extruder barrel to reduce steam formation at the operating temperature. The resulting dispersions were cooled and filtered through a 200 micron filter.

Comparative Example D

Comparative Example D was prepared according to the following procedures based on the formulation components listed in Table I. For the base polymer use INFUSE™ 9807 (The Dow Chemical Company, CAS No. 26221-73-8), which is an olefin block copolymer having a melt index of approximately 12-18 g/10 min (ASTM 1238, 190° C./2.16 kg); and for a non-polymeric stabilizing agent use Behenic acid (a surfactant, 100% active).

Feed each of the base polymer and the non-polymeric stabilizing agent into a 25 mm twin screw extruder (extruder speed approximately 500 rpms) by means of controlled rate feeders to be forwarded and melted. Ramp the extruder temperature profile to approximately 140° C., prior to the introduction of initial water and potassium hydroxide (KOH, 30 wt % in water) (CAS Number 71769-53-4) as the neutralizing agent at the initial water introduction point. Feed dilution water via a second pump into the dilution zone of the extruder. The initial water and dilution water were optionally pre-heated to approximately 120° C. At the extruder outlet, a back-pressure regulator was used to adjust to a suitable pressure inside the extruder barrel to reduce steam formation at the operating temperature. The resulting dispersions were cooled and filtered through a 200 micron filter.

Comparative Example E

Comparative Example E was prepared according to the following procedures based on the formulation components listed in Table I. For the base polymer use AMPLIFY™ EA103 (The Dow Chemical Company, CAS 26221-73-8) is an ethylene-ethyl acrylate copolymer having a melt index of approximately 18-24 g/10 min (ASTM 1238, 190° C./2.16 kg); and for the polymeric stabilizing agent use PRIMA-COR™ 5980i (The Dow Chemical Company, CAS No. 9010-77-9).

Feed each of the base polymer and the polymeric stabilizing agent into a 25 mm twin screw extruder (extruder speed approximately 470 rpms) by means of controlled rate feeders to be forwarded and melted. Ramp the extruder temperature profile to approximately 160° C., prior to the introduction of initial water and N,N-dimethylethanolamine (100%) (CAS Number 108-01-0) as the neutralizing agent at the initial water introduction point. The initial water and dilution water were optionally pre-heated to approximately 140° C. After adding dilution water, cool the mixture to a temperature below 100° C. by the end of the extruder. At the extruder outlet, a back-pressure regulator was used to adjust to a suitable pressure inside the extruder barrel to reduce steam formation at the operating temperature. The resulting dispersions were cooled and filtered through a 200 micron filter.

Comparative Example F

Comparative Example F was prepared according to the following procedures based on the formulation of components listed in Table 2. For the base polymer use OudraSperse™ WB 4001 (The Dow Chemical Company), which is a waterborne novolac epoxy dispersion with approximately 57-59 weight percent solids and an epoxy equivalent weight of approximately 184-204, and OudraCure WB 8001 Curing Agent (The Dow Chemical Company), which is a polyamine adduct with approximately 50 weight percent solids and an amine hydrogen equivalent weight of 300 (as delivered). These two components were blended using a high speed mixer at approximately 2000 rpms.

Comparative Example G

Comparative Example G was prepared according to the following procedures based on the formulation of components listed in Table 2. For the base polymer use D.E.N™ 438 (The Dow Chemical Company), which is a novolac epoxy resin with an epoxy equivalent weight of approximately 184-204 and blended with xylene (CAS No. 1330-20-7) as a solvent. Add POLYPOX 1H7016 (The Dow Chemical Company), which is a phenol free modified Mannich base curing agent with an amine hydrogen equivalent weight of 70 (as delivered), to the D.E.N™ 438/xylene mixture and blended using a high speed mixer at approximately 2000 rpms.

TABLE 1

| Ex | Base Polymer (g/min) (wt. %) | Poly Perfor Improv- Agent (g/min) (wt. %) | Poly Coup Agent (g/min) (wt. %) | Polymeric stabilizing agent (g/min) (wt. %) | Neutral- izing Agent (mL/ min) | Initial Water Rate (mL/ min) | Dilution Water Rate (mL/ min) | Average Particle Size Diameter (μm) | Wt % Solids |
|---|---|---|---|---|---|---|---|---|---|
| 1 | VERS 4000.01 (52.9) (70) | (0) | LICOC 6542 (5.67) (7.5) | PRIM 5980i (17.0) (22.5) | DMEA (6.4) | 19.1 | 83 | 0.77 | 46.9 |
| 2 | DMDA- 8940 (192.5) (616) | AMPLIFY GR-204 (40.3) (13.3) | LICOC 4351 (27.5) (9.1) | PRIM 5980i (42.4) (14) | DMEA (31.9) | 60.5 | 360 | 0.56 | 45.5 |
| 3 | DMDA- 8940 (175.5) (58) | AMPLIFY GR-204 (39.3) (13) | LICOC 4351 (21.2) (7) | PRIM 5980i (66.6) (22) | DMEA (33.2) | 66.6 | 360 | 0.77 | 47.9 |
| 4 | DMDA- 8940 (53) (70) | (0) | Honey AC575-P (7.6) (10) | PRIM 5980i (15.1) (20) | DMEA (5.6) | 15.1 | 85 | 1.1 | 45.0 |
| 5 | 6D43 (212) (70) | (0) | LICOC 6542 (23) (7.6) | PRIM 5980i (68) (22.4) | DMEA (26) | 70 | 320 | 1.0 | 42.0 |
| 6 | 6D43 (182) (60) | VERSIFY 4200 (30) (10) | LICOC 6542 (23) (7.6) | PRIM 5980i (68) (22.4) | DMEA (41) | 73 | 256 | 0.95 | 45.0 |
| Comp A | 6D43 (52.9) | (0) | (0) | PRIM 5890i (22.7) | DMEA (6.07) | 20.0 | 85 | 2.49 | 40.8 |
| Comp B | ENGAGE 8407 (64.3) | (0) | | PRIM 5980i (11.3) | DMEA (3.92) | 15.1 | 75 | 0.72 | 45.2 |
| Comp C | VERS 3200 (52.9) | (0) | LICOC 6542 (5.67) | PRIM 5980i (17.0) | DMEA (6.42) | 16.4 | 83 | 1.3 | 49.0 |

TABLE 1-continued

| Ex | Base Polymer (g/min) (wt. %) | Poly Perfor Improv- Agent (g/min) (wt. %) | Poly Coup Agent (g/min) (wt. %) | Polymeric stabilizing agent (g/min) (wt. %) | Neutral- izing Agent (mL/ min) | Initial Water Rate (mL/ min) | Dilution Water Rate (mL/ min) | Average Particle Size Diameter (μm) | Wt % Solids |
|---|---|---|---|---|---|---|---|---|---|
| Comp D | Infuse D9807 (75.6) | (0) | (0) | Behenic Acid (2.3) | KOH (1) | 2.7 | 86 | 1.1 | 46.2 |
| Comp E | Amplify EA103 (60.5) | (0) | (0) | PRIM 5980i (15.1) | DMEA (5.2) | 10.9 | 70 | 2.8 | 52.5 |

TABLE 2

Table of Comparative Epoxy Coatings

| | Base Polymer (Wt %) | Curing agent (Wt %) | Solvent (Wt %) |
|---|---|---|---|
| Comp F | OUDRASPERSE 4001 (52.7) | OUDRACURE 8001 (47.3) | |
| Comp G | DEN 438 (60.7) | Polypox IH7016 (24.1) | Xylene (15.2) |

TABLE 3

Performance Results for Examples 1-6 and Comparative Examples A-G on Uncoated Cold Rolled Steel

| Example | Film Thickness (mil) | Adhesion | Direct Impact | Reversed Impact | MEK Double Rubs | 7 Day H$_2$SO$_4$ | 7 Day HCl | 7 Day Acetic Acid | 7 Day 50% NaOH | 10 Cycle F/T Adhesion | Mandrel Wedge Bend (mm) |
|---|---|---|---|---|---|---|---|---|---|---|---|
| 1 | 2.8 | 5B | 60 | 100 | 80 | 4 | 5 | 5 | 5 | 4 | 0 |
| 2 | 2.6 | 5B | 140 | 60 | >200 | 5 | 5 | 5 | 5 | 5 | 35 |
| 3 | 2.7 | 5B | 160 | 120 | 200 | 0 | 5 | 4 | 5 | 5 | 50 |
| 4 | 2.7 | 5B | 80 | 40 | >200 | 4 | 5 | 4 | 5 | 4 | 38 |
| 5 | 3.0 | 4B | 0 | 0 | 200 | 1 | 0 | 3 | 5 | 5 | 50 |
| 6 | 1.6 | 5B | 160 | 40 | >200 | 0 | 0 | 0 | — | — | 0 |
| A | 2.5 | 2B | 0 | 0 | 160 | 5 | 3 | 5 | 5 | 2 | 0 |
| B | 2.4 | 0B | 0 | 0 | 200 | 0 | 0 | 0 | 0 | 5 | 80 |
| C | 2.9 | 2B | 120 | 120 | 92 | 0 | 5 | 0 | 5 | 5 | 0 |
| D | 1.0 | 0B | 40 | 80 | 15 | 0 | 0 | 0 | 0 | 0 | 0 |
| E | 3.0 | 2B | 0 | 20 | 200 | 0 | 1 | 3 | 5 | 5 | 0 |
| F | 3.3 | 5B | 20 | 0 | >200 | 5 | 5 | 3 | 5 | 5 | 90 |
| G | 5.8 | 5B | 20 | 20 | >200 | 5 | 5 | 3 | 5 | 3 | 90 |

TABLE 4

Coating Adhesion to Substrates

| Composition | Coating | | | |
|---|---|---|---|---|
| | Cold Rolled Steel | Polyurethane | Epoxy | Cement |
| Example 1 | 5B | 4B | 5B | 5B |
| Example 2 | 5B | 4B | 5B | 0B |
| Example 3 | 5B | 5B | 5B | 3B |
| Example 4 | 4B | 4B | 5B | 5B |
| Example 5 | 4B | 5B | 5B | 5B |
| Comp Ex A | 2B | 0B | 5B | 3B |
| Comp Ex B | 5B | 0B | 5B | 3B |
| Comp Ex C | 0B | 0B | 0B | 5B |
| Comp Ex D | 0B | 0B | 0B | 0B |
| Comp Ex E | 2B | 0B | 0B | 5B |

TABLE 5

Adhesion, Impact Resistance, and Flexibility for Coating Compositions (200° C. Cure Temperature) on Polyurethane and Epoxy Substrates

| | Adhesion | Direct Impact (inch-lb) | Reversed Impact (inch-lb) | Mandrel Wedge Bend (mm) |
|---|---|---|---|---|
| Epoxy Substrate | | | | |
| Example 1 | 5B | 60 | 160 | 0 |
| Example 2 | 5B | 160 | 120 | 0 |
| Example 3 | 5B | 160 | 120 | 0 |
| Example 5 | 5B | 120 | 20 | 0 |
| Polyurethane Substrate | | | | |
| Example 1 | 5B | 100 | 40 | 0 |
| Example 2 | 5B | 160 | 100 | 0 |

TABLE 5-continued

Adhesion, Impact Resistance, and Flexibility for Coating Compositions (200° C. Cure Temperature) on Polyurethane and Epoxy Substrates

| | Adhesion | Direct Impact (inch-lb) | Reversed Impact (inch-lb) | Mandrel Wedge Bend (mm) |
|---|---|---|---|---|
| Example 3 | 5B | 160 | 120 | 0 |
| Example 5 | 4B | 40 | 0 | 0 |

TABLE 6

Performance Properties of Examples with the Addition of Primid Cross-linker (0.6 wt. % of Primid QM-1260 was added to the dispersion and mixed for 3 minutes at 3000 rpms).

| Sample | Film Thick (mils) | MEK | Direct Impact (inch-lbs) | Reverse Impact (inch-lbs) | Adhesion | 7 Day Acetic Acid | 7 Day HCl | 7 Day Sulfuric Acid | 7 Day 50% NaOH | Mandrel Wedge Bend (mm) |
|---|---|---|---|---|---|---|---|---|---|---|
| Ex 1 | 2.9 | 180 | 160 | 160 | 5B | 0B | 5B | 0B | 5B | 80 |
| Ex 2 | 1.6 | 200 | 160 | 160 | 5B | 5B | 3B | 5B | 58 | 0 |
| Ex 3 | 1.8 | 200 | 140 | 120 | 5B | 5B | 5B | 5B | 5B | 0 |
| Ex 4 | 1.7 | 200 | 140 | 120 | 5B | 58 | 5B | 3B | 5B | 40 |
| Ex 5 | 3.2 | 200 | 160 | 160 | 5B | 58 | 58 | 5B | 5B | 0 |
| Ex 6 | 3.0 | 200 | 160 | 160 | 5B | 5B | 5B | 5B | 5B | — |
| Comp Ex A | 1.6 | 200 | 0 | 0 | 0B | 0B | 0B | 0B | 5B | 0 |
| Comp Ex B | 2.4 | 127 | 160 | 160 | 5B | 5B | 1B | 0B | 5B | 0 |
| Comp Ex C | 1.5 | 120 | 0 | 0 | 3B | 1B | 0B | 3B | 1B | 80 |
| Comp Ex D | 1.4 | 25 | 60 | 0 | 0B | 08 | 0B | 0B | 0B | 0 |
| Comp Ex E | 2.1 | 200 | 0 | 0 | 5B | 4B | 0B | 0B | 5B | 0 |
| Comp Ex F | 1.2 | 150 | 0 | 0 | 0B | 0B | 0B | 0B | 0B | 0 |

We claim:

1. A coating composition, comprising:
   40 to 80 weight percent (wt. %) of a base polymer;
   5 to 15 wt. % of a polymeric coupling agent;
   10 to 30 wt. % of a polymeric stabilizing agent;
   5 to 35 wt. % of a polymeric performance improving agent;
   a neutralizing agent that partially or fully neutralizes the polymeric stabilizing agent; and
   a fluid medium, where the percent values are based on the total weight of the base polymer, the polymeric coupling agent, the polymeric stabilizing agent, the polymeric performance improving agent of the coating composition and sum to a value of 100 wt. %.

2. The coating composition of claim 1, where the base polymer is selected from the group consisting of a non-functionalized ethylene polymer, a non-functionalized propylene polymer, a non-functionalized propylene/ethylene copolymer, and a combination thereof.

3. The coating composition of claim 2, where the non-functionalized ethylene polymer is selected from the group consisting of polyethylene, a polyethylene-copolymer and a combination thereof.

4. The coating composition of claim 2, where the non-functionalized ethylene polymer, non-functionalized propylene polymer, or non-functionalized ethylene/propylene copolymer has a crystalline melting point of 100° C. to 230° C.

5. The coating composition of claim 1, where the base polymer is a non-functionalized propylene polymer.

6. The coating composition of claim 1, where the polymeric stabilizing agent is an ethylene-acrylic acid and ethylene-methacrylic acid copolymer having a functionality in a range of 10 wt. % to 25 wt. %.

7. The coating composition of claim 1, where the polymeric coupling agent is selected from the group consisting of a functionalized polypropylene, a functionalized polyethylene homopolymer, a copolymer that has been modified with carboxylic acid groups, a copolymer that has been modified with anhydride groups and a combination thereof.

8. The coating composition of claim 1, where the polymeric performance improving agent is selected from the group consisting of functionalized polyethylene, functionalized polypropylene, non-functionalized copolymer of ethylene and propylene and a combination thereof.

9. The coating composition of claim 1, where acid groups of the polymeric stabilizing agent are neutralized with the neutralizing agent.

10. The coating composition of claim 1, where the neutralizing agent is a volatile base.

11. The coating composition of claim 10, where the volatile base is N,N-dimethylethanolamine.

12. The coating composition of claim 1, where the fluid medium is water.

13. A coating layer formed with the coating composition of claim 1.

14. The coating layer of claim 13, where the coating layer is on a substrate.

15. The coating layer of claim 14, where the substrate is selected from the group consisting of a metal, a polyurethane, a cured epoxy, a cement or a combination thereof.

16. The coating composition of claim 1, where the coating composition further includes a lubricant.

17. The coating composition of claim 16, where the lubricant is a wax.

18. The coating composition of claim 17, where the wax is selected from the group consisting of fatty acid ester wax, silicon-based wax, fluorine-based wax, polyolefin wax, carnauba wax, lanolin wax and combinations thereof.

19. The coating composition of claim 1, further including 0.5 to 50 wt. % of a cross-linking agent, where the percent values are based on the total weight of the base polymer, the polymeric coupling agent, the polymeric stabilizing agent, the polymeric performance improving agent, and the cross-linking agent of the coating composition and sum to a value of 100 wt. %.

20. The coating composition of claim 19, where the cross-linking agent is a hydroxyalkyl amide and the coating composition includes 0.5 to 10 wt. % of the cross-linking agent.

* * * * *